(12) United States Patent
Kouyama

(10) Patent No.: US 11,676,546 B2
(45) Date of Patent: Jun. 13, 2023

(54) DISPLAY APPARATUS AND METHOD OF ADJUSTING DISPLAY APPARATUS TO DISPLAY A PHASE DISTRIBUTION PATTERN

(71) Applicant: C/O SONY SEMICONDUCTOR SOLUTIONS CORPORATION, Kanagawa (JP)

(72) Inventor: Yoshiaki Kouyama, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/419,340

(22) PCT Filed: Nov. 25, 2019

(86) PCT No.: PCT/JP2019/045923
§ 371 (c)(1),
(2) Date: Jun. 29, 2021

(87) PCT Pub. No.: WO2020/144950
PCT Pub. Date: Jul. 16, 2020

(65) Prior Publication Data
US 2022/0084475 A1 Mar. 17, 2022

(30) Foreign Application Priority Data
Jan. 11, 2019 (JP) .............................. JP2019-003100

(51) Int. Cl.
*G09G 3/34* (2006.01)
*G02F 1/133* (2006.01)
(Continued)

(52) U.S. Cl.
CPC ....... *G09G 3/3406* (2013.01); *G02F 1/13306* (2013.01); *G09G 3/002* (2013.01);
(Continued)

(58) Field of Classification Search
CPC ........ G09G 3/001; G09G 3/002; G09G 3/006; G09G 3/007; G09G 3/02; G09G 3/025;
(Continued)

(56) References Cited

U.S. PATENT DOCUMENTS

2008/0174581 A1 7/2008 Matsumoto et al.
2013/0176167 A1* 7/2013 Bergeron ........... G02B 27/0087
342/25 F
(Continued)

FOREIGN PATENT DOCUMENTS

CN 101226292 A 7/2008
CN 105452955 A 3/2016
(Continued)

OTHER PUBLICATIONS

International Search Report and Written Opinion of PCT Application No. PCT/JP2019/045923, dated Feb. 18, 2020, 09 pages of ISRWO.

*Primary Examiner* — Keith L Crawley
(74) *Attorney, Agent, or Firm* — Chip Law Group

(57) ABSTRACT

A display apparatus includes a light source, an optical phase modulator, a drive circuit, and a controller. The optical phase modulator includes a plurality of pixels, and modulates a phase of light from the light source for each of the pixels by displaying a phase distribution pattern indicated by phase distribution data. The drive circuit performs voltage application to the optical phase modulator based on the phase distribution data. The controller divides a pixel region in the optical phase modulator into a plurality of division regions. The controller causes the drive circuit to perform voltage application based on adjustment data to perform display in at least one division region of the plurality of division regions. The adjustment data is for determining an amount of voltage application performed by the drive circuit. The (Continued)

EXAMPLE OF REPRODUCTION IMAGE CORRESPONDING TO ADJUSTMENT DATA amount of voltage application corresponds to the phase distribution data. The display is based on the adjustment data.

6 Claims, 23 Drawing Sheets

(51) Int. Cl.
G09G 3/00 (2006.01)
G09G 3/36 (2006.01)

(52) U.S. Cl.
CPC ........... *G09G 3/36* (2013.01); *G02F 2203/50* (2013.01); *G09G 2320/045* (2013.01)

(58) Field of Classification Search
CPC ...... G09G 3/34; G09G 3/3406; G09G 3/3433; G09G 3/346; G09G 3/36; G09G 2310/024; G09G 2320/0285; G09G 2320/045; G09G 2320/062; G09G 2360/141; G09G 2360/16; G02F 1/13306; G02F 2203/12; G02F 2203/50; G02F 2203/69; G03B 21/005; G03B 21/006; G03B 21/008; H04N 5/7416; H04N 5/7441; H04N 2005/745; H04N 9/31; H04N 9/3102; H04N 9/312; H04N 9/3155; H04N 9/3191; H04N 9/3194; H04N 9/3197

See application file for complete search history.

(56) References Cited

U.S. PATENT DOCUMENTS

| | | | |
|---|---|---|---|
| 2015/0036057 A1 | 2/2015 | Richards | |
| 2015/0146196 A1* | 5/2015 | Huang | G01J 9/00 356/121 |
| 2015/0185523 A1* | 7/2015 | Matsumoto | G02F 1/13306 359/238 |
| 2015/0279293 A1* | 10/2015 | Missbach | G09G 3/3614 345/94 |
| 2017/0127025 A1* | 5/2017 | Damberg | G03B 21/00 |
| 2018/0173082 A1 | 6/2018 | Okumura | |
| 2018/0302542 A1* | 10/2018 | Masumura | H04N 5/2256 |
| 2020/0183260 A1* | 6/2020 | Fukui | G03B 21/005 |
| 2021/0136335 A1* | 5/2021 | Tanaka | G02B 5/1871 |
| 2021/0141261 A1* | 5/2021 | Kouyama | G03B 21/00 |

FOREIGN PATENT DOCUMENTS

| | | |
|---|---|---|
| JP | 2005-195832 A | 7/2005 |
| JP | 2009-031367 A | 2/2009 |
| JP | 2016-532899 A | 10/2016 |
| WO | 2016/208171 A1 | 12/2016 |
| WO | 2018/211878 A1 | 11/2018 |

* cited by examiner

[FIG. 1]
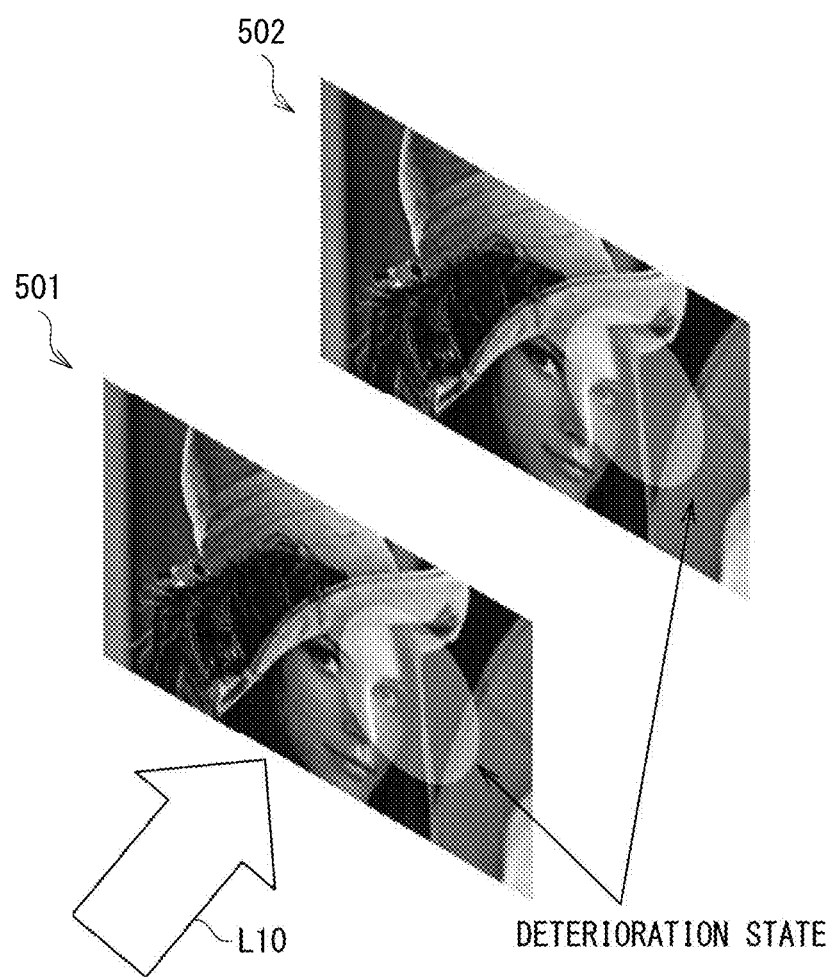

[FIG. 2]
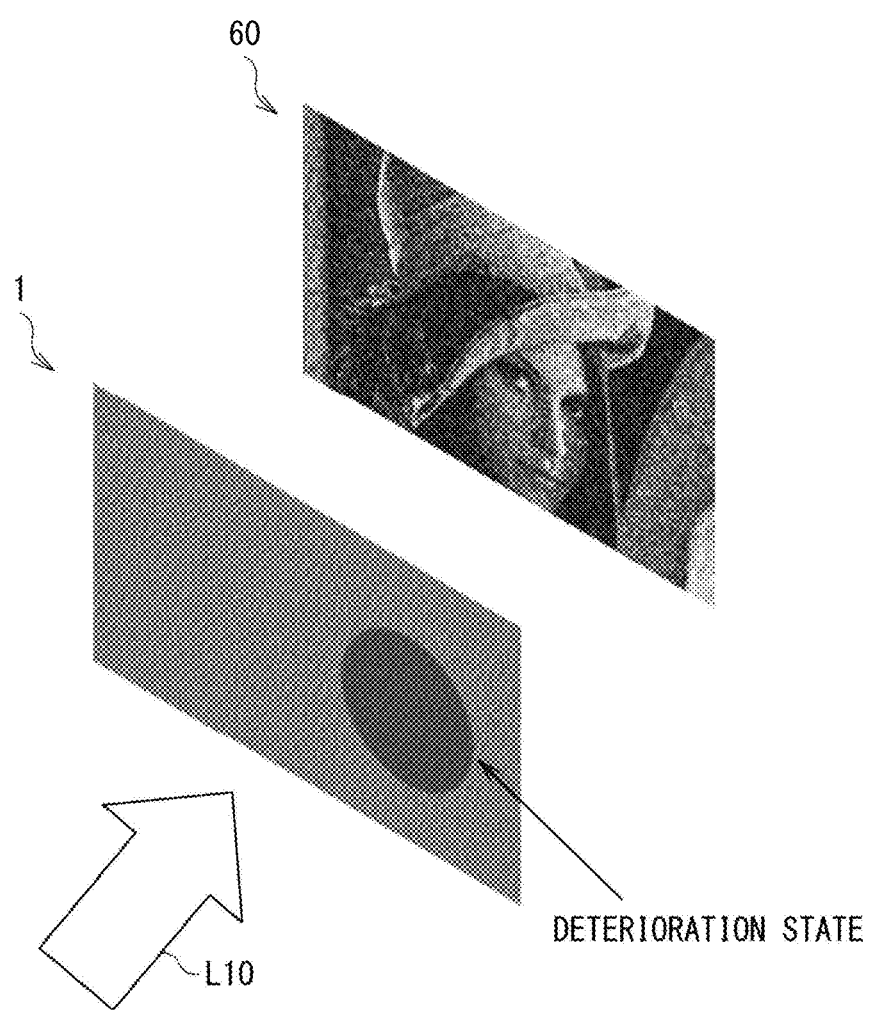

[FIG. 3]
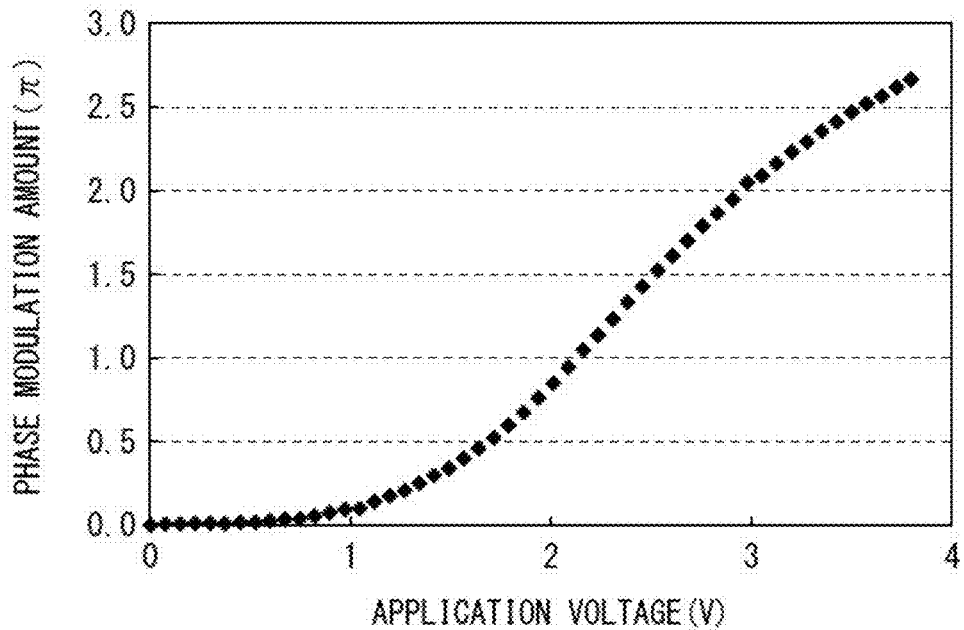
[FIG. 4]
AFTER APPLICATION VOLTAGE RANGE AND VOLTAGE STEP ARE ADJUSTED
(STATE IN WHICH APPLICATION VOLTAGE RANGE IS ADJUSTED
TO OBTAIN PHASE MODULATION AMOUNT OF 0 TO $2\pi$)
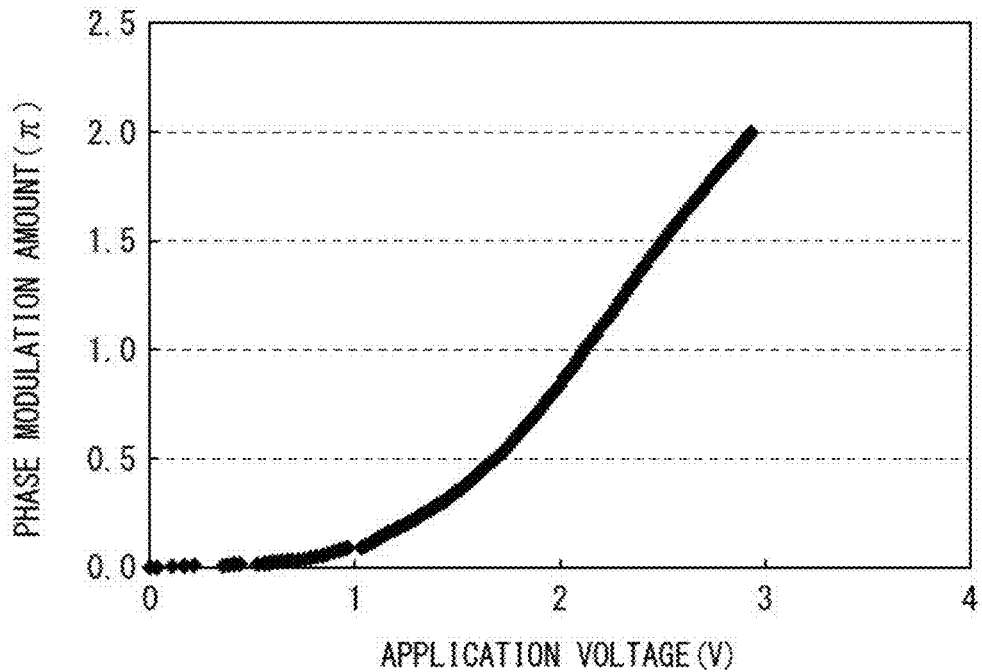

[FIG. 5]
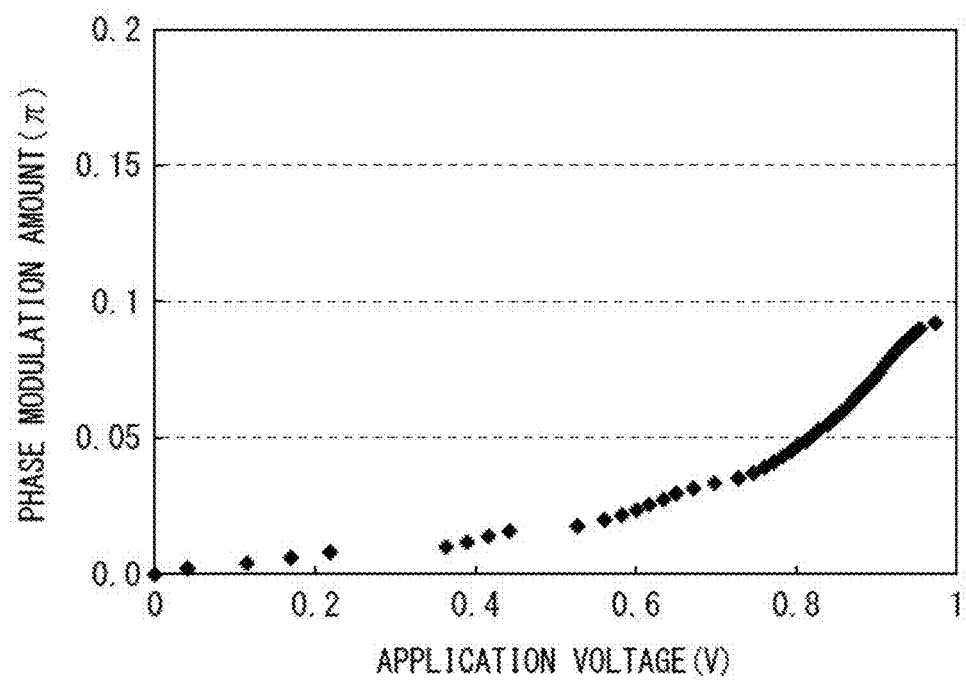

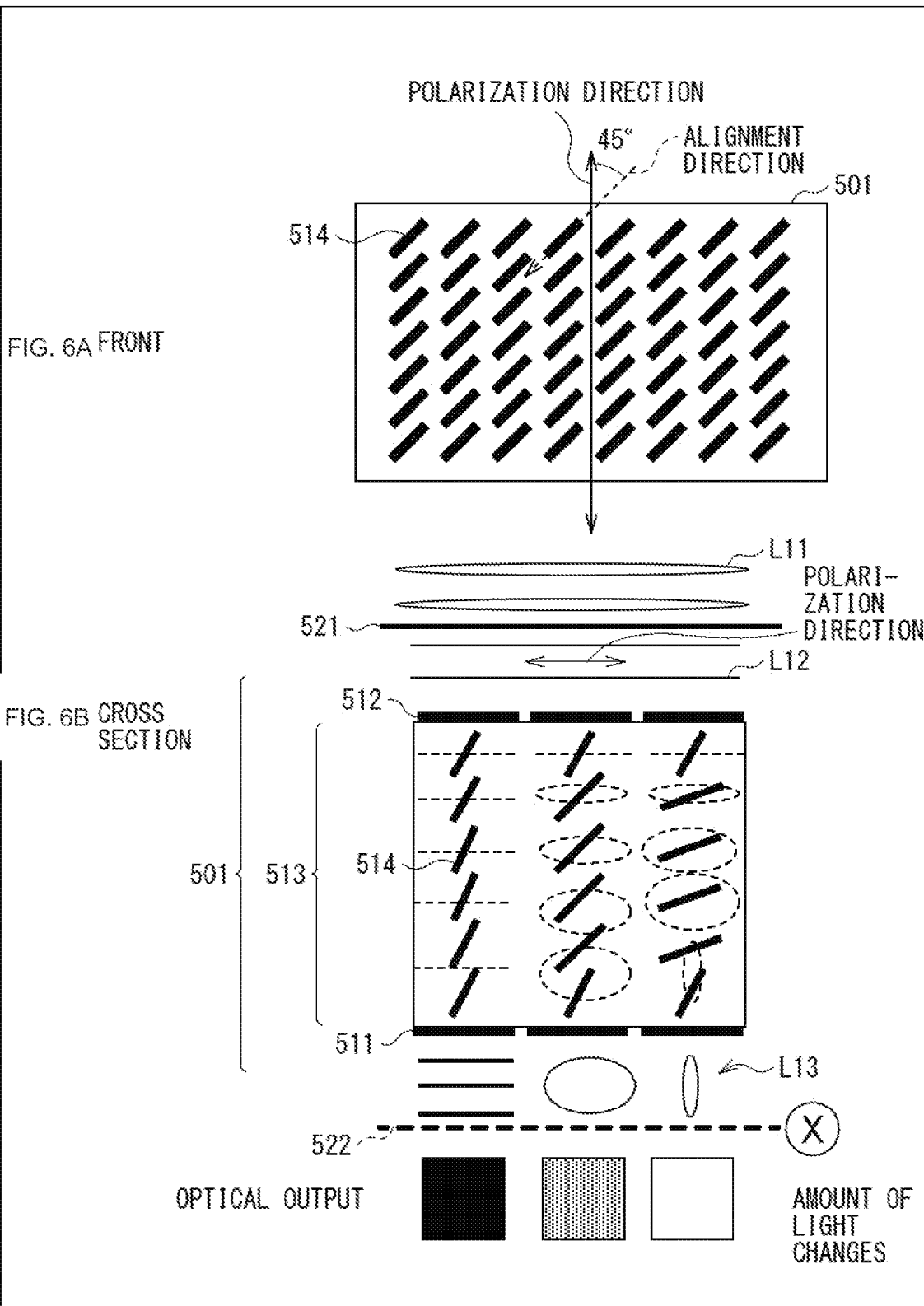

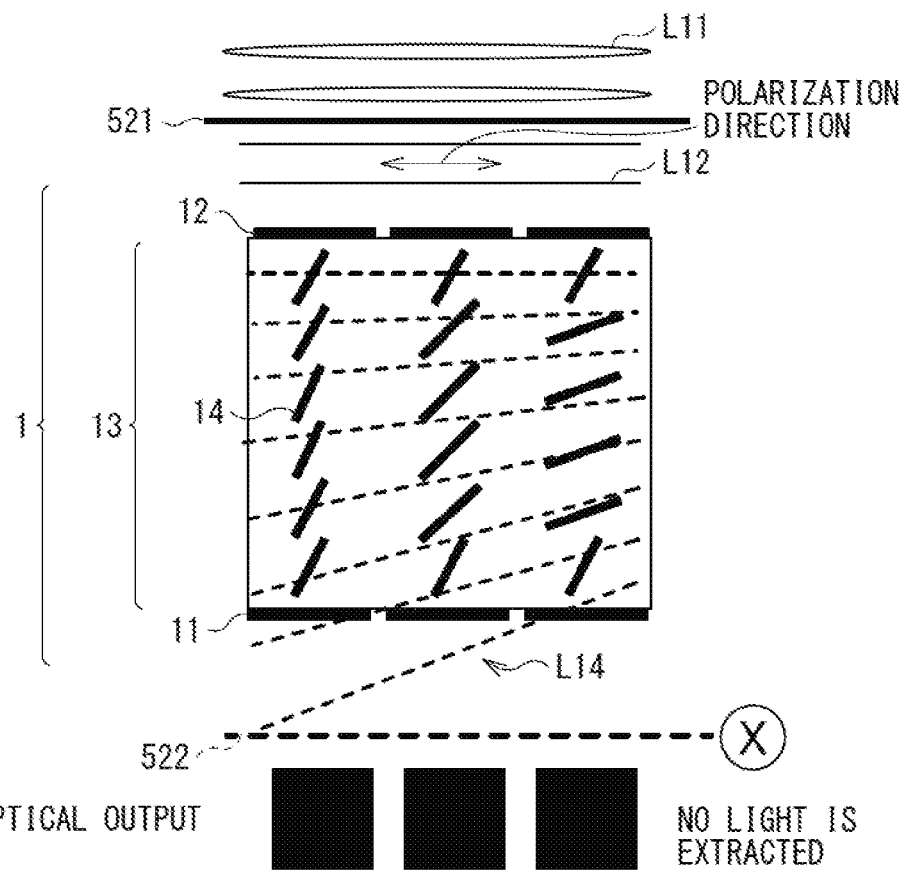

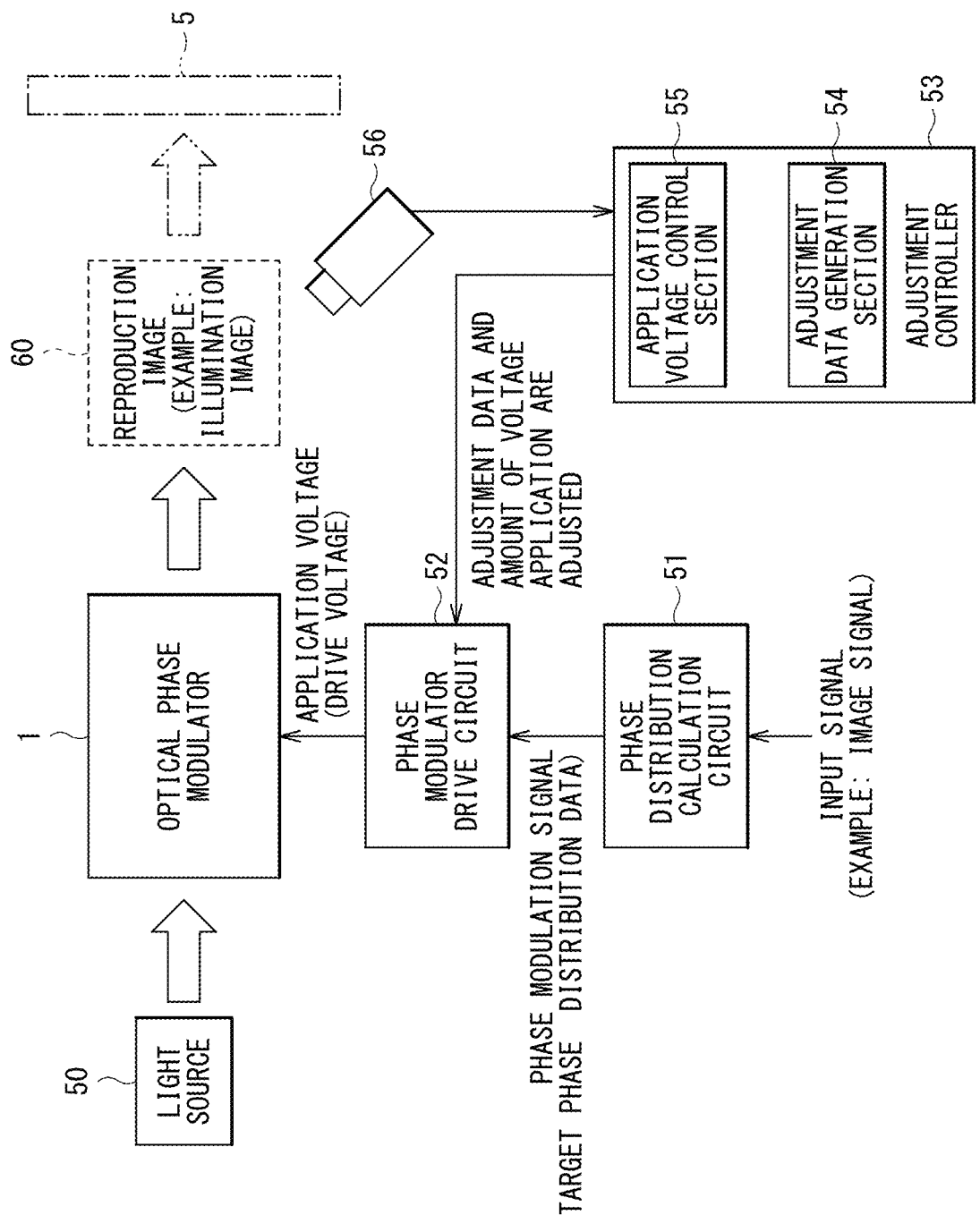
[FIG. 8]

[FIG. 9]
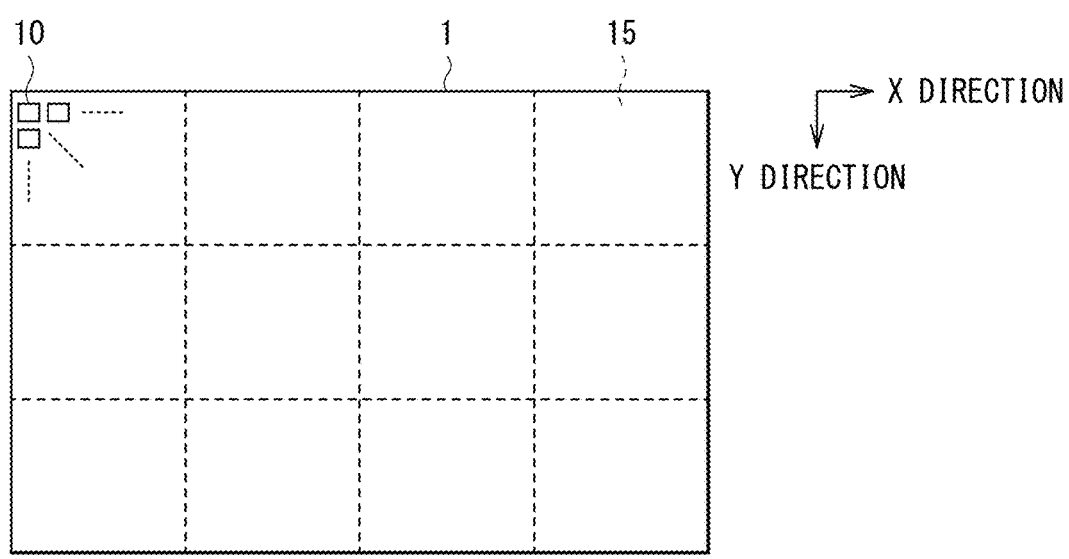

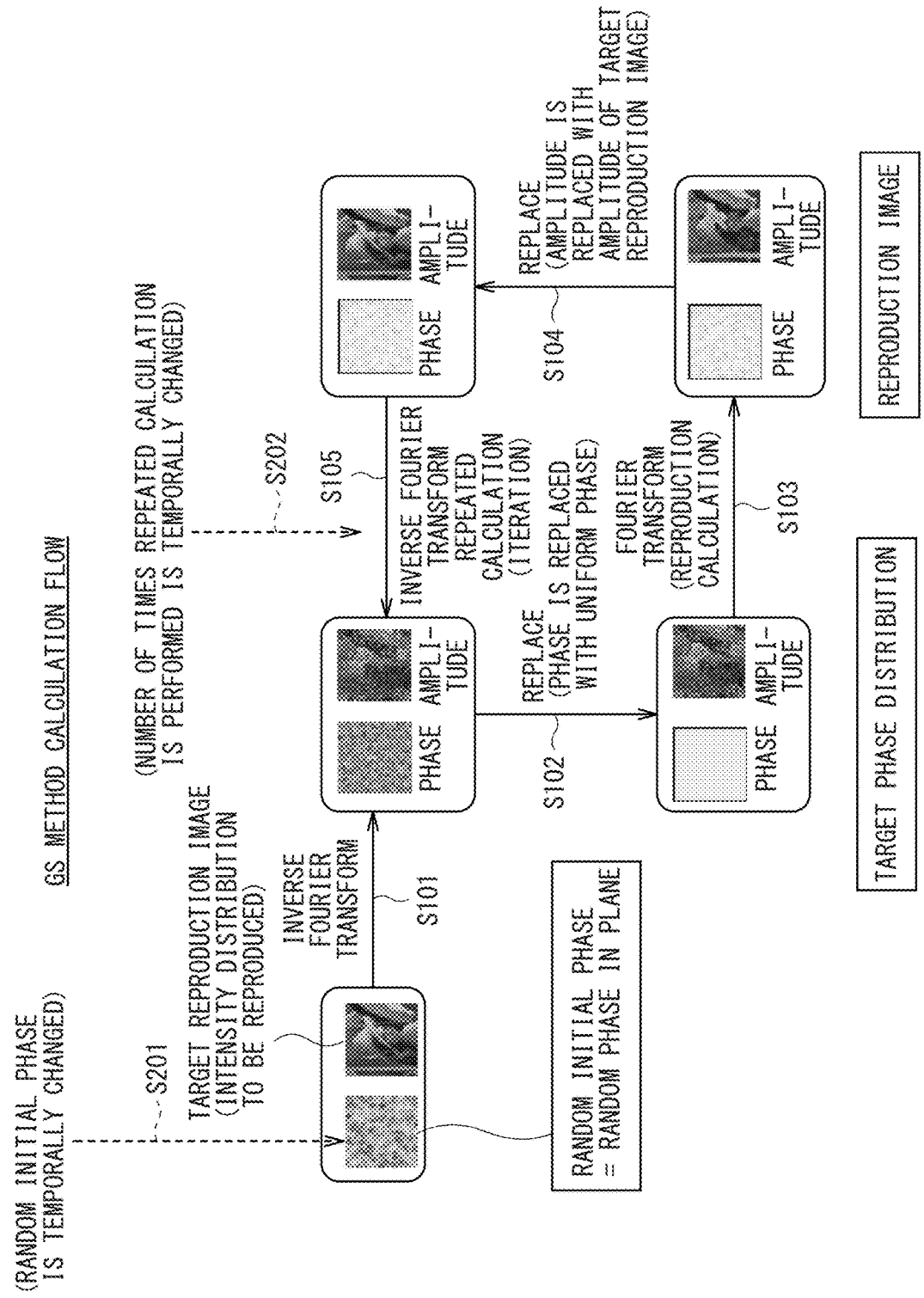
[FIG. 10]

[FIG. 11]
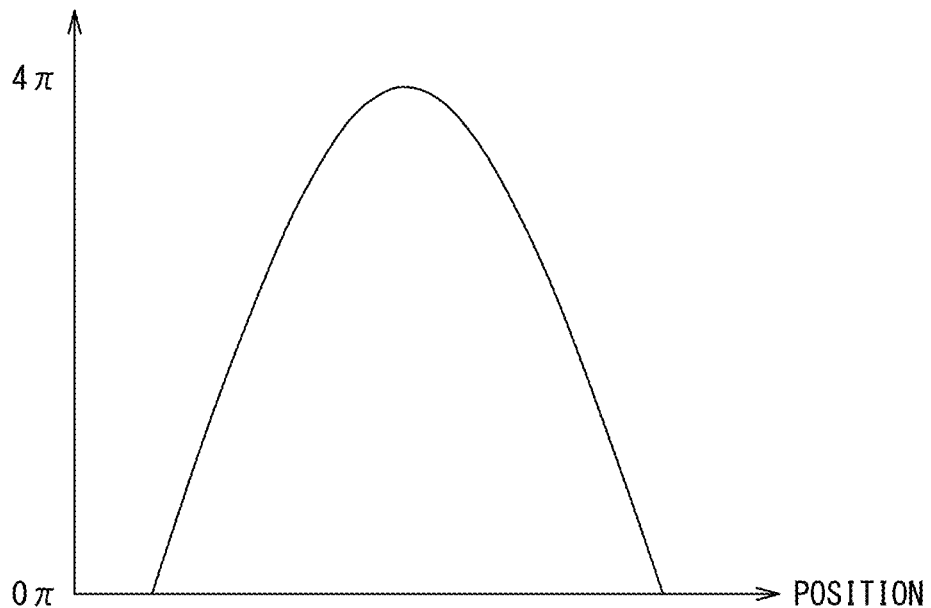

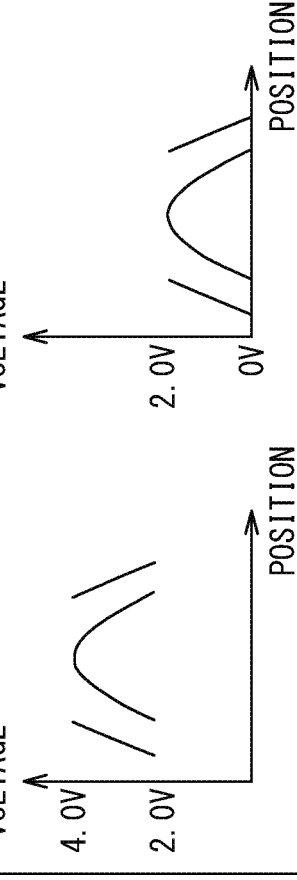

[FIG. 13]
EXAMPLE OF REPRODUCTION IMAGE CORRESPONDING TO ADJUSTMENT DATA
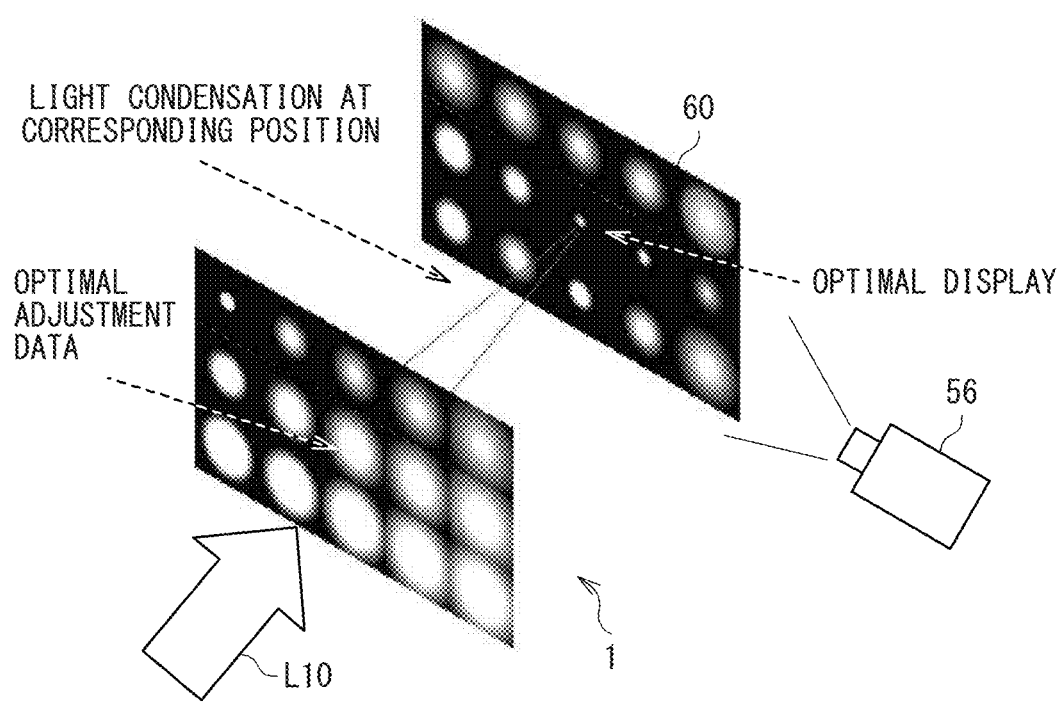

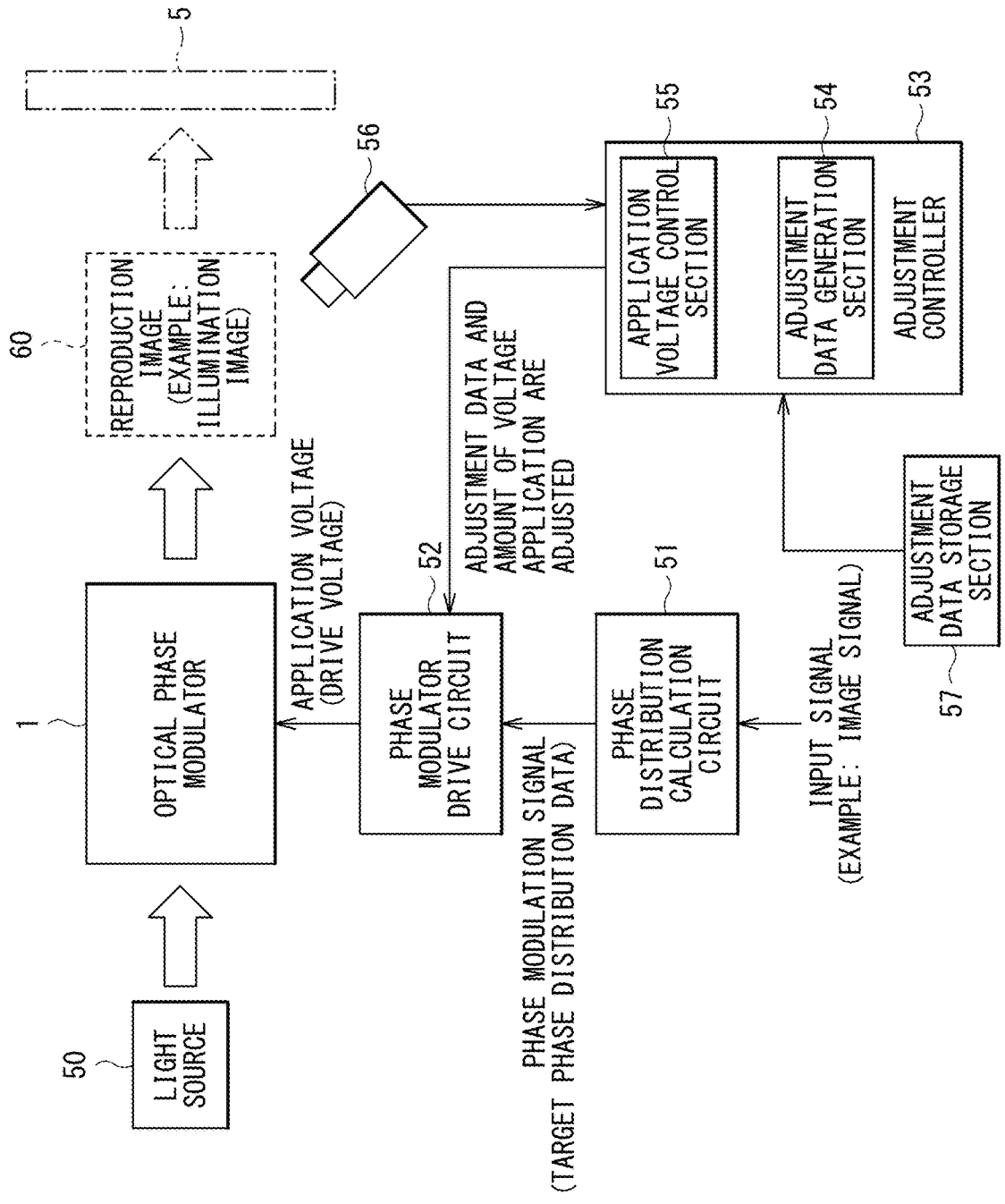
[FIG. 14]

[FIG. 15]
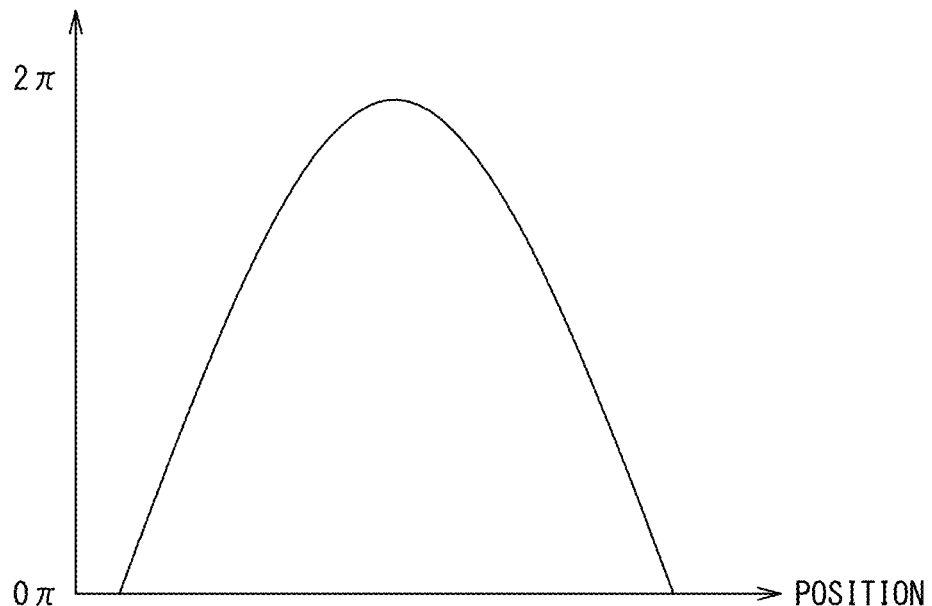

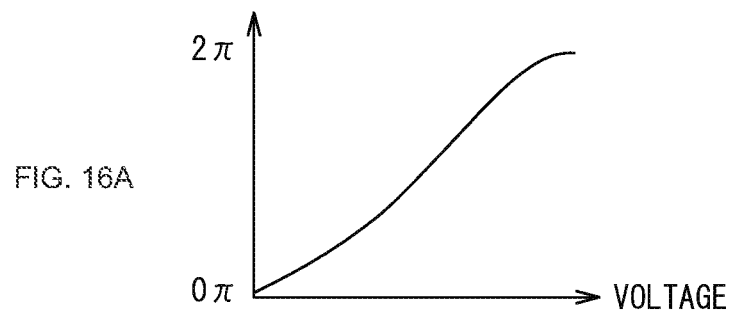
FIG. 16A
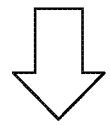
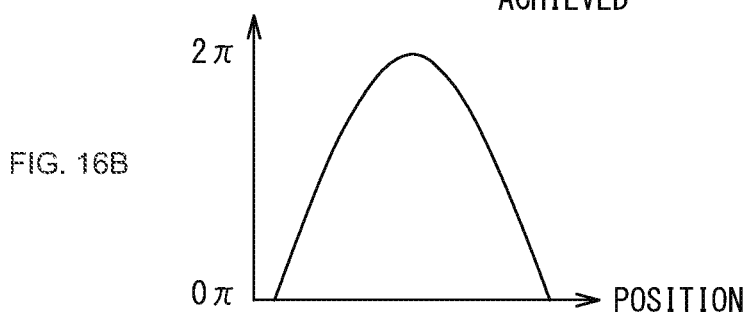
FIG. 16B

ADJUSTMENT EXAMPLE IN WHICH REFRACTION IS USED
(IN CASE WHERE IT IS POSSIBLE TO OBTAIN ONLY PHASE MODULATION AMOUNT OF $1.5\pi$)
FIG. 17A
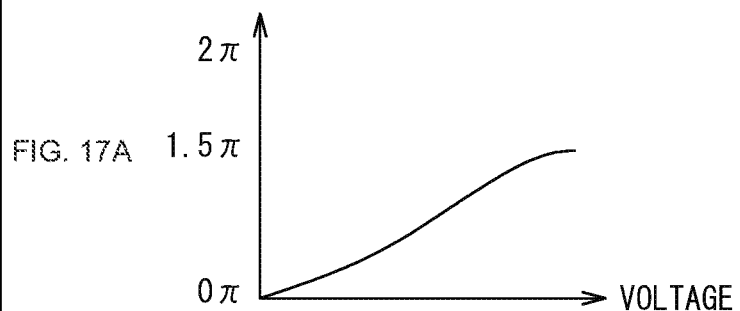
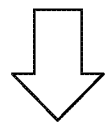
FIG. 17B
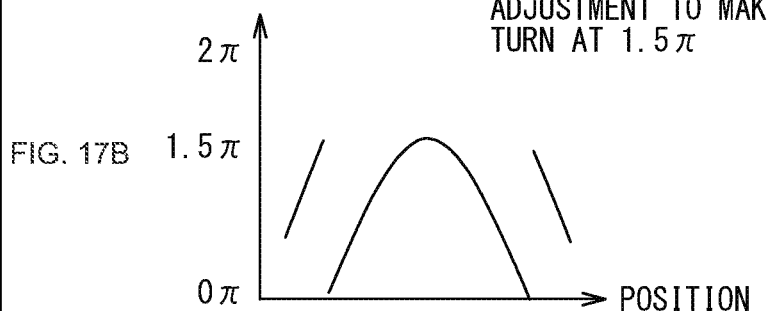
ADJUSTMENT TO MAKE TURN AT $1.5\pi$

[FIG. 18]
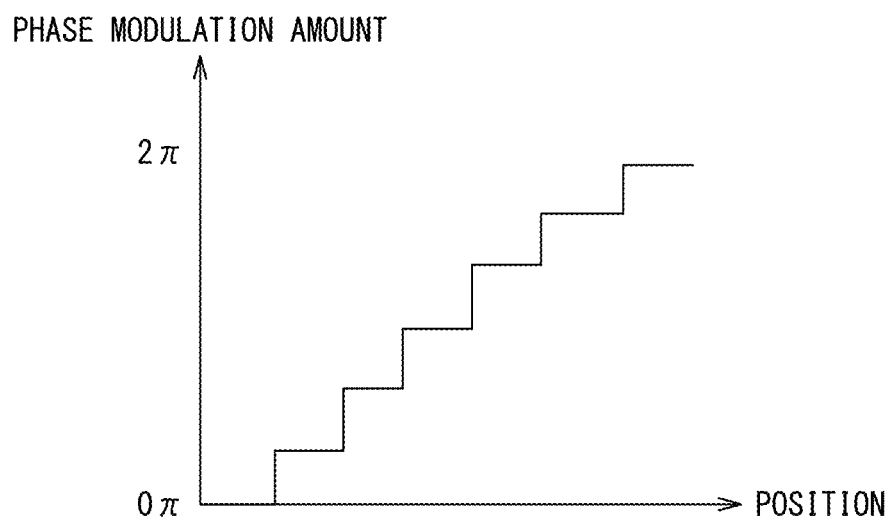

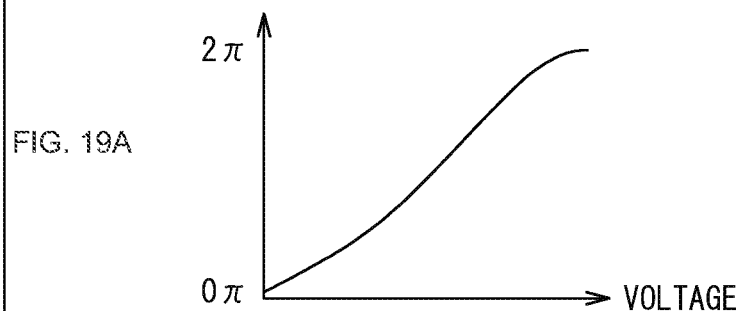
FIG. 19A
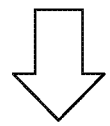
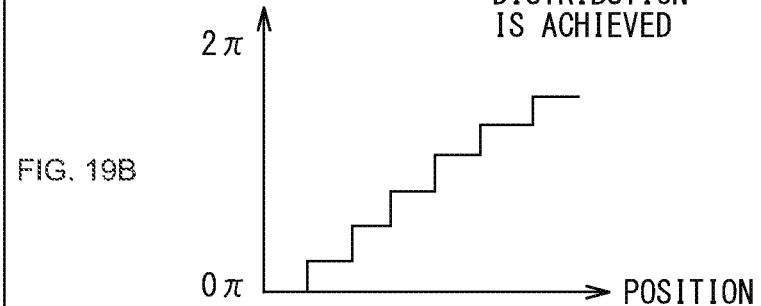
FIG. 19B

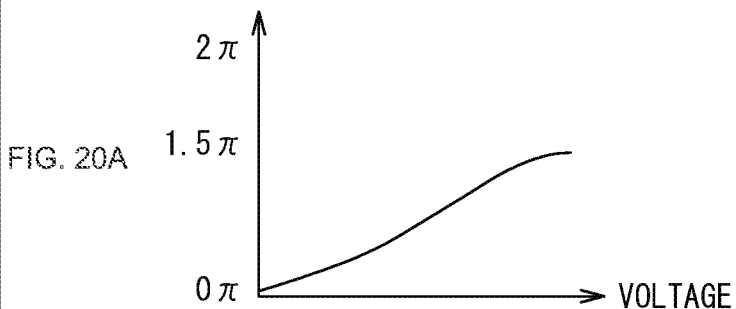
FIG. 20A
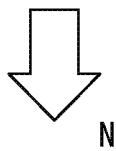
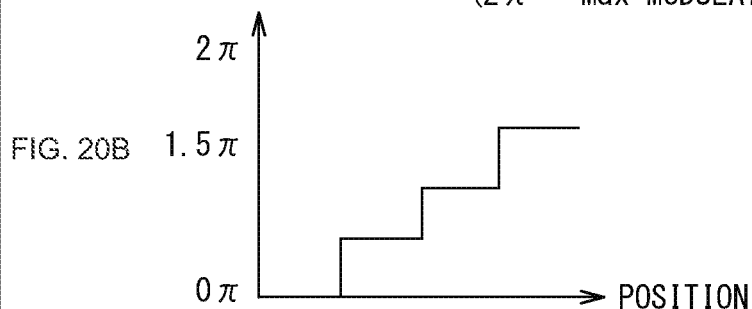
FIG. 20B

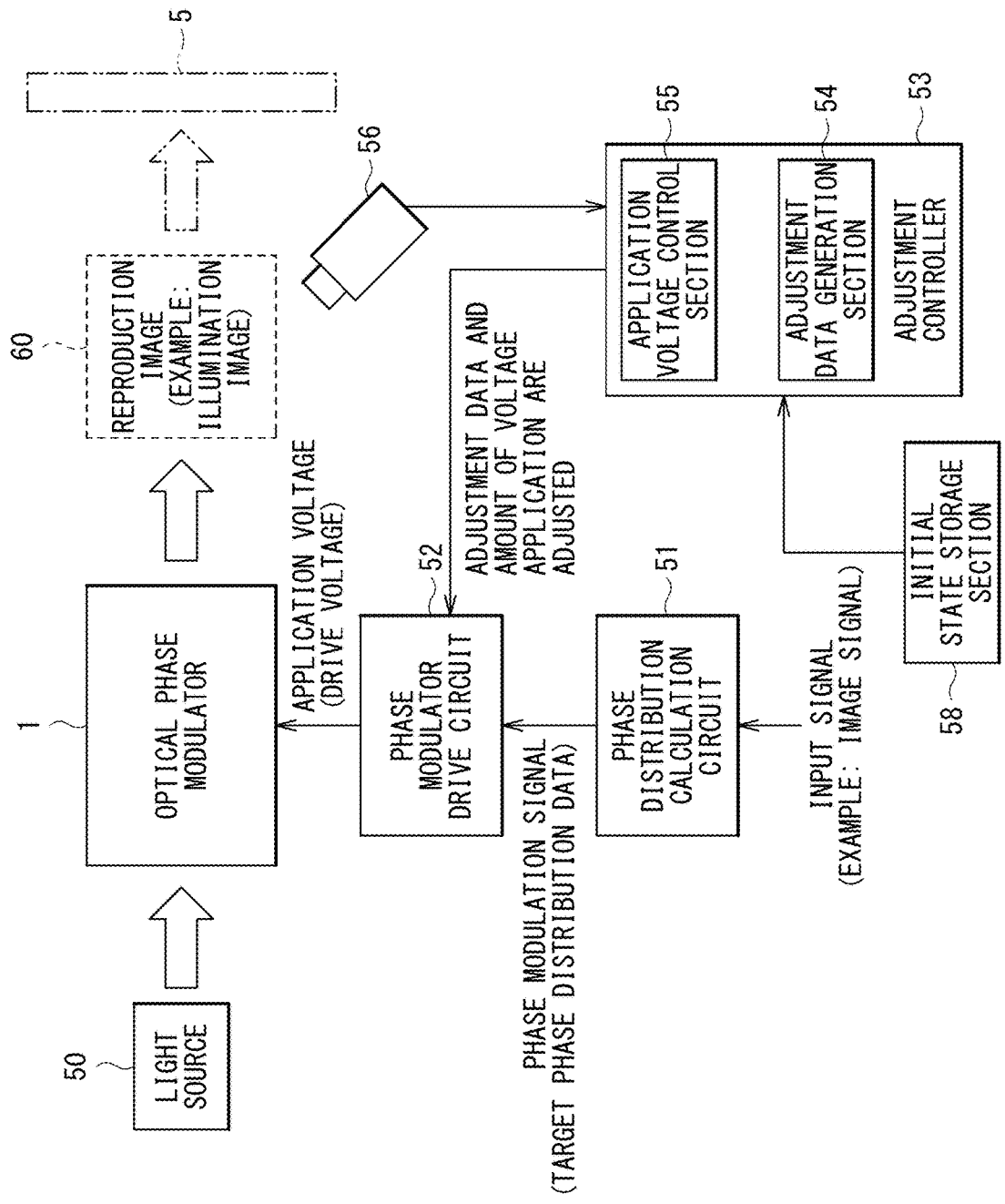
[FIG. 21]

[FIG. 22]
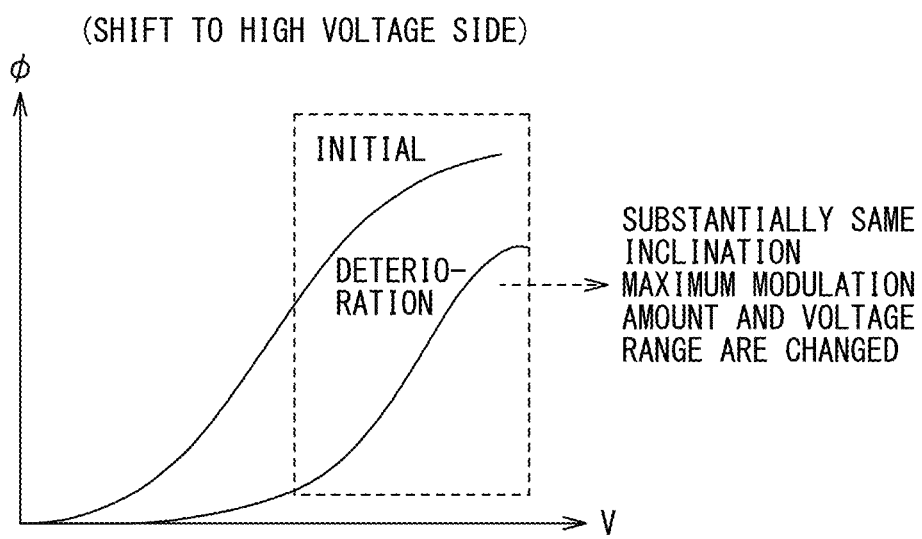

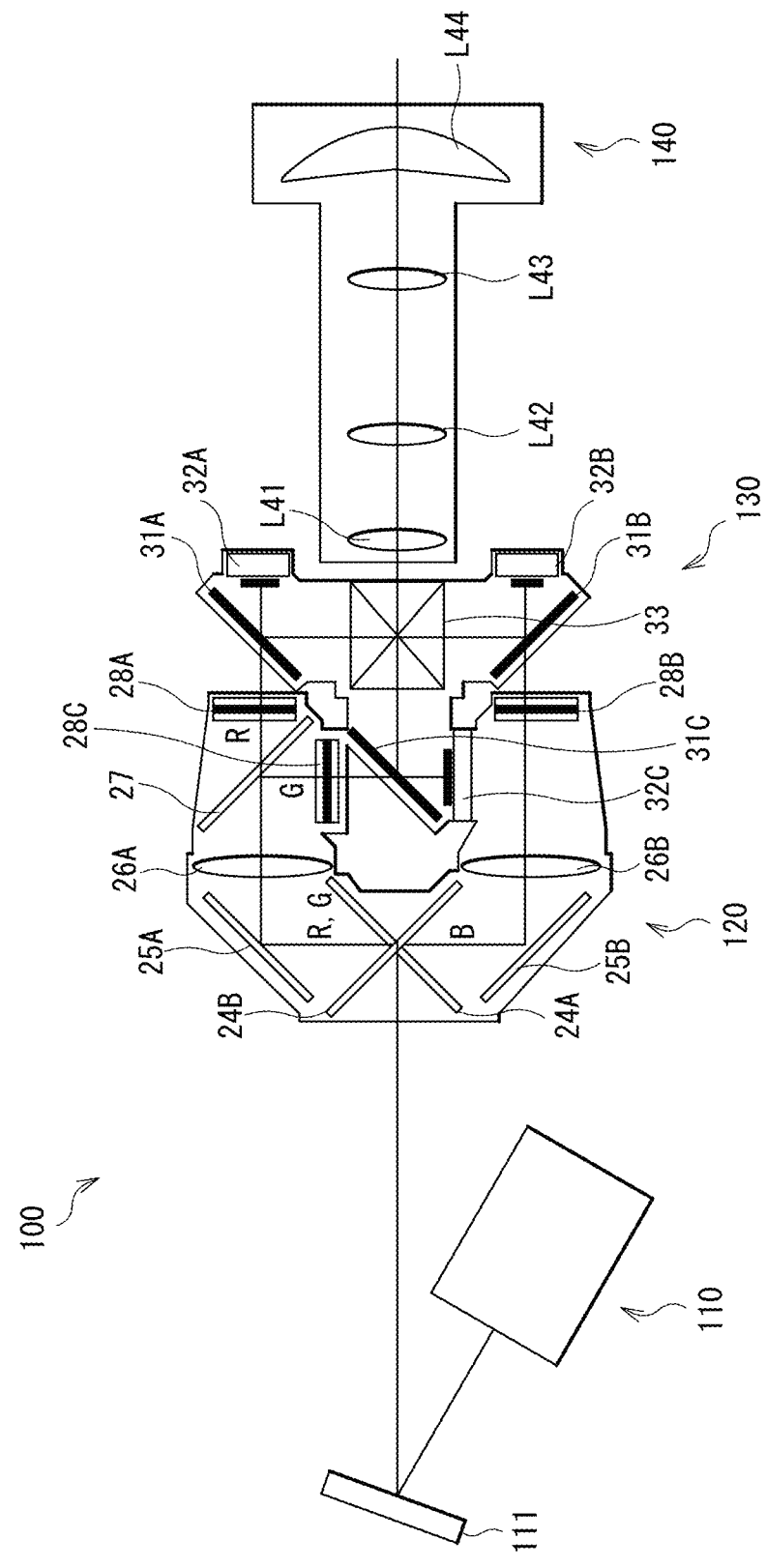
[FIG. 23]

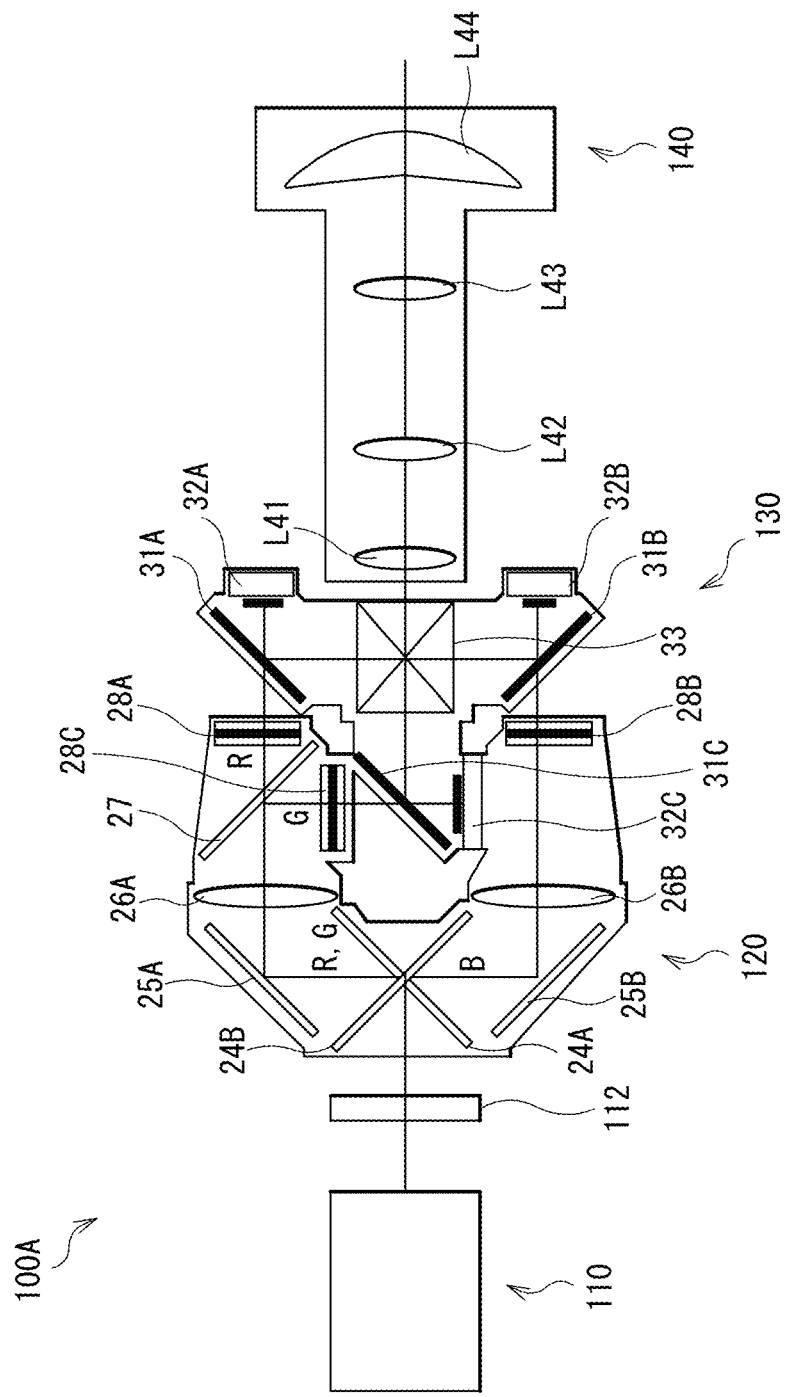
[FIG. 24]

DISPLAY APPARATUS AND METHOD OF ADJUSTING DISPLAY APPARATUS TO DISPLAY A PHASE DISTRIBUTION PATTERN

CROSS REFERENCE TO RELATED APPLICATIONS

This application is a U.S. National Phase of International Patent Application No. PCT/JP2019/045923 filed on Nov. 25, 2019, which claims priority benefit of Japanese Patent Application No. JP 2019-003100 filed in the Japan Patent Office on Jan. 11, 2019. Each of the above-referenced applications is hereby incorporated herein by reference in its entirety.

TECHNICAL FIELD

The present disclosure relates to a display apparatus including an optical phase modulator and a method of adjusting a display apparatus.

BACKGROUND ART

A display apparatus is known that displays an image by modulating the luminance (intensity) of light by an optical intensity modulator. In addition, there is a technique that detects and corrects an image quality defect in an optical intensity modulator (see PTL 1). Meanwhile, an optical phase modulator is known that obtains a desirable reproduction image by modulating the phase of light. The optical phase modulator includes, for example, SLM (Spatial Light Modulator) such as a liquid crystal panel. A practical application example of such an optical phase modulator includes technology that uses the optical phase modulator for an illumination unit in a projector to generate a reproduction image having the phase modulated in accordance with on an image and uses the reproduction image as illumination light for an optical intensity modulator for image display. In addition, the optical phase modulator is also used for holography technology or the like. In addition, the optical phase modulator is also used for technology such as an optical switch or an optical computer.

CITATION LIST

Patent Literature

PTL 1: Japanese Unexamined Patent Application Publication No. 2005-195832

SUMMARY OF THE INVENTION

It is difficult for a display apparatus including an optical phase modulator to detect the position and degree of an image quality defect in the optical phase modulator from a reproduction image. It is therefore difficult to make an appropriate image quality correction.

It is desirable to provide a display apparatus and a method of adjusting a display apparatus each of which makes it possible to achieve higher image quality.

A display apparatus according to an embodiment of the present disclosure includes: a light source; an optical phase modulator; a drive circuit; and a controller. The optical phase modulator includes a plurality of pixels. The optical phase modulator modulates a phase of light from the light source for each of the pixels by displaying a phase distribution pattern indicated by phase distribution data. The drive circuit performs voltage application to the optical phase modulator. The voltage application is based on the phase distribution data. The controller divides a pixel region in the optical phase modulator into a plurality of division regions. The controller causes the drive circuit to perform voltage application based on adjustment data to perform display in at least one division region of the plurality of division regions. The adjustment data is for determining an amount of voltage application performed by the drive circuit. The amount of voltage application corresponds to the phase distribution data. The display is based on the adjustment data.

A method of adjusting a display apparatus according to an embodiment of the present disclosure includes: modulating, by displaying a phase distribution pattern indicated by phase distribution data on an optical phase modulator including a plurality of pixels, a phase of light from the light source for each of the pixels; performing, by a drive circuit, voltage application based on the phase distribution data to the optical phase modulator; and dividing, by a controller, a pixel region in the optical phase modulator into a plurality of division regions and causing the drive circuit to perform voltage application based on adjustment data to perform display in at least one division region of the plurality of division regions. The adjustment data is for determining an amount of voltage application performed by the drive circuit. The amount of voltage application corresponds to the phase distribution data. The display is based on the adjustment data.

The display apparatus according to the embodiment of the present disclosure or the method of adjusting the display apparatus divides the pixel region in the optical phase modulator into the plurality of division regions and performs the voltage application based on the adjustment data to perform the display based on the adjustment data in at least the one division region of the plurality of division regions. The adjustment data is for determining the amount of voltage application performed by the drive circuit. The amount of voltage application corresponds to the phase distribution data.

BRIEF DESCRIPTION OF DRAWING

FIG. 1 is an explanatory diagram illustrating an overview of a deterioration state of display by a display apparatus according to a comparative example that includes an optical intensity modulator.

FIG. 2 is an explanatory diagram illustrating an overview of a deterioration state of display by a display apparatus according to a comparative example that includes an optical phase modulator.

FIG. 3 is an explanatory diagram illustrating an example of a relationship between an application voltage and a phase modulation amount in the optical phase modulator.

FIG. 4 is an explanatory diagram illustrating an example of a relationship between the application voltage and the phase modulation amount in the optical phase modulator after an application voltage range and a voltage step are adjusted.

FIG. 5 is an explanatory diagram illustrating a partially enlarged voltage range of 0 to 1.0 V in FIG. 4.

FIGS. 6A and 6B are explanatory diagrams schematically illustrating an example of a configuration of the optical intensity modulator and a change in a polarization state of light by the optical intensity modulator.

FIGS. 7A and 7B are explanatory diagrams schematically illustrating an example of a configuration of the optical phase modulator and a change in a polarization state of light by the optical phase modulator.

FIG. 8 is a block diagram schematically illustrating a configuration example of a main portion of a display apparatus according to a first embodiment of the present disclosure.

FIG. 9 is an explanatory diagram illustrating an example of a pixel region of an optical phase modulator in the display apparatus according to the first embodiment.

FIG. 10 is an explanatory diagram illustrating an example of a technique of generating target phase distribution data in the display apparatus according to the first embodiment.

FIG. 11 is an explanatory diagram illustrating an example of phase distribution of a division region of the optical phase modulator in an X direction from which adjustment data in the display apparatus according to the first embodiment originates.

FIGS. 12A, 12B, 12C, and 12D are explanatory diagrams illustrating an example of the adjustment data in the display apparatus according to the first embodiment.

FIG. 13 is an explanatory diagram illustrating a display example of the optical phase modulator based on the adjustment data in the display apparatus according to the first embodiment and an example of a reproduction image corresponding to the adjustment data.

FIG. 14 is a block diagram schematically illustrating a configuration example of a main portion of a display apparatus according to a second embodiment.

FIG. 15 is an explanatory diagram illustrating an example of desired phase distribution of the adjustment data in a case where refraction is used in the display apparatus according to the second embodiment.

FIGS. 16A and 16B are explanatory diagrams illustrating an example of adjustment data that achieves the desired phase distribution illustrated in FIG. 15 in a case where it is possible to obtain a phase adjustment amount of 2π.

FIGS. 17A and 17B are explanatory diagrams illustrating an example of adjustment data that achieves phase distribution corresponding to the desired phase distribution illustrated in FIG. 15 in a case where it is possible to obtain only a phase adjustment amount of 1.5π.

FIG. 18 is an explanatory diagram illustrating an example of desired phase distribution of the adjustment data in a case where diffraction is used in the display apparatus according to the second embodiment.

FIGS. 19A and 19B are explanatory diagrams illustrating an example of adjustment data that achieves the desired phase distribution illustrated in FIG. 18 in a case where it is possible to obtain a phase adjustment amount of 2π.

FIGS. 20A and 20B are explanatory diagrams illustrating an example of adjustment data that achieves phase distribution corresponding to the desired phase distribution illustrated in FIG. 18 in a case where it is possible to obtain only a phase adjustment amount of 1.5π.

FIG. 21 is a block diagram schematically illustrating a configuration example of a main portion of a display apparatus according to a third embodiment.

FIG. 22 is an explanatory diagram illustrating an example of deterioration of a modulation characteristic of the optical phase modulator.

FIG. 23 is a configuration diagram schematically illustrating a first application example in which the display apparatus is applied to a projector.

FIG. 24 is a configuration diagram schematically illustrating a second application example in which the display apparatus is applied to a projector.

MODES FOR CARRYING OUT THE INVENTION

The following describes embodiments of the present disclosure in detail with reference to the drawings. It is to be noted that description is given in the following order.

0. Comparative Example (FIGS. 1, 2, 3, 4, 5, 6A, 6B, 7A, and 7B)
1. First Embodiment (FIGS. 8, 9, 10, 11, 12A, 12B, 12C, 12D, and 13)
 1.1 Configuration
 1.2 Operation
 1.3 Effects
2. Second Embodiment (FIGS. 14, 15, 16A, 16B, 17A, 17B, 18, 19A, 19B, and 20)
3. Third Embodiment (FIGS. 21 to 22)
4. Fourth Embodiment (FIGS. 23 to 24)
5. Other Embodiments

0. Comparative Example

FIG. 1 illustrates an overview of the deterioration state of display by a display apparatus according to a comparative example that includes an optical intensity modulator 501.

In this display apparatus according to the comparative example, the luminance (intensity) of light L10 from a light source that is not illustrated is modulated, for example, by the optical intensity modulator 501 such as a liquid crystal panel to generate a projection image 502. In the display apparatus having such a luminance modulation (intensity modulation) scheme, the amount of voltage application to each of the pixels in the optical intensity modulator 501 and the luminance change amount (intensity modulation) of each of the pixels of the projection image 502 by the amount of voltage application are directly associated. As illustrated in FIG. 1, the deterioration position and the deterioration state of each of pixels in the optical intensity modulator 501 are similarly observed in each of pixels of the projection image 502. It is therefore easy for the display apparatus having a luminance modulation scheme to adjust the display state of each pixel in the optical intensity modulator 501. For example, the technology described in PTL 1 (Japanese Unexamined Patent Application Publication No. 2005-195832) allows an image reader to detect an image quality defect such as a smudge or unevenness occurring in the optical intensity modulator 501 from the projection image 502 and makes it possible to makes a display state correction corresponding to the pixel position for the optical intensity modulator 501 on the basis of a result of the detection.

FIG. 2 illustrates an overview of the deterioration state of display by a display apparatus according to a comparative example that includes an optical phase modulator 1.

In this display apparatus according to the comparative example, the phase of the light L10 from a light source that is not illustrated is modulated, for example, by the optical phase modulator 1 such as a liquid crystal panel to generate a reproduction image 60. It is difficult for the display apparatus having such a phase modulation scheme to directly associate the amount of voltage application to each of the pixels in the optical phase modulator 1 and the luminance change amount of each of the pixels of the reproduction image 60 by the amount of voltage application. The phase modulation scheme includes a diffractive phase modulation scheme and a refractive phase modulation scheme. For example, in a case of a diffractive phase modulation scheme, the deterioration position and the deterioration state of each of pixels in the optical phase modulator 1 affect the whole of the reproduction image 60. It is thus difficult to detect the deterioration position and the deterioration state of each of pixels in the optical phase modulator 1 from the reproduction image 60. In addition, in a case of a refractive phase modulation scheme, it is substantially possible to determine the deterioration position of each of pixels in the optical phase modulator 1 from the reproduction image 60, but it is difficult to detect the deterioration state. It is therefore difficult to detect the position and of each of pixels having an image quality defect in the optical phase modulator 1 and the degree of the image quality defect from the reproduction image 60. It is difficult to make a display state correction corresponding to the pixel position for the optical phase modulator 1 on the basis of a result of the detection on the reproduction image 60.

FIG. 3 illustrates an example of the relationship between an application voltage (V) and a phase modulation amount (π) in the optical phase modulator 1. FIG. 4 illustrates an example of the relationship between the application voltage (V) and the phase modulation amount (π) in the optical phase modulator 1 after an application voltage range and a voltage step are adjusted. FIG. 5 illustrates a partially enlarged voltage range of 0 to 1.0 V in FIG. 4. Each of FIGS. 4 and 5 illustrates an example of the relationship between the application voltage (V) and the phase modulation amount (π) after the application voltage range and the voltage step are adjusted to obtain a phase modulation amount of 0 to 2π.

To reproduce the desired reproduction image 60 by using the optical phase modulator 1, it is necessary to generate phase distribution data having phase distribution that allows the optical phase modulator 1 to reproduce the desired reproduction image 60. For example, a known technique of generating phase distribution data is the Gerchberg-Saxton method (GS method) that creates phase distribution data by repeating Fourier transform.

In a case where the optical phase modulator 1 is a liquid crystal panel, the amount of voltage application to a pixel and the phase modulation amount have a nonlinear relationship as illustrated in FIG. 3. To display the desired phase distribution data, it is thus necessary to adjust the voltage range and the voltage step for the phase distribution data as illustrated in each of FIGS. 4 and 5.

FIGS. 6A and 6B schematically illustrate an example of a configuration of the optical intensity modulator 501 and the polarization state of light by the optical intensity modulator 501. FIG. 6A schematically illustrates a configuration of the optical intensity modulator 501 as viewed from the front direction and the polarization state of light. FIG. 6B schematically illustrates a cross-sectional configuration of the optical intensity modulator 501 and the polarization state of light. It is to be noted that FIGS. 6A and 6B illustrate a configuration example in which the optical intensity modulator 501 is a transmissive optical intensity modulator. In addition, FIGS. 6A and 6B illustrate an example in which the intensity of light is modulated by using birefringence.

With respect to the optical intensity modulator 501, a polarizer 521 is disposed in the incidence direction of light and an analyzer 522 is disposed in the emission direction of light. The optical intensity modulator 501 has a configuration in which a liquid crystal layer 513 is sandwiched between a plurality of pixel electrodes 511 and a plurality of pixel electrodes 512. The plurality of pixel electrodes 511 and the plurality of pixel electrodes 512 are opposed to each other. The liquid crystal layer 513 includes a plurality of liquid crystal molecules 514. In the liquid crystal layer 513, the plurality of liquid crystal molecules 514 is arranged to have a predetermined alignment direction The polarizer 521 emits polarized light L12 obtained by polarizing incident light L11 in a predetermined polarization direction. The alignment direction of the liquid crystal molecules 514 is, for example, the direction inclined by 45° in the polarization direction of the polarized light L12 as viewed from the front direction as illustrated in FIG. 6A. The inclination of the liquid crystal molecules 514 in a cross-sectional view changes in accordance with a voltage applied between the pixel electrodes 511 and the pixel electrodes 512 opposed to each other as illustrated in FIG. 6B. This causes the polarization state of intensity-modulated light L13 emitted from the optical intensity modulator 501 to change in accordance with the application voltage. The amount of light finally emitted from the analyzer 522 changes in accordance with the polarization state of the intensity-modulated light L13.

FIGS. 7A and 7B schematically illustrate an example of a configuration of the optical phase modulator 1 and a change in a polarization state of light by the optical phase modulator 1. FIG. 7A schematically illustrates a configuration of the optical phase modulator 1 as viewed from the front direction and the polarization state of light. FIG. 7B schematically illustrates a cross-sectional configuration of the optical phase modulator 1 and the polarization state of light. It is to be noted that FIGS. 7A and 7B illustrate a configuration example in which the optical phase modulator 1 is a transmissive optical phase modulator. In addition, FIGS. 7A and 7B illustrate an example in which the intensity of light is modulated by using birefringence.

FIGS. 7A and 7B illustrate a configuration example in which the polarizer 521 is disposed in the incidence direction of light and the analyzer 522 is disposed in the emission direction of light with respect to the optical phase modulator 1 as in the configuration in FIGS. 6A and 6B. The optical phase modulator 1 has a configuration in which a liquid crystal layer 13 is sandwiched between a plurality of pixel electrodes 11 and a plurality of pixel electrodes 12. The plurality of pixel electrodes 11 and the plurality of pixel electrodes 12 are opposed to each other. The liquid crystal layer 13 includes a plurality of liquid crystal molecules 14. In the liquid crystal layer 13, the plurality of liquid crystal molecules 14 is arranged to have a predetermined alignment direction The polarizer 521 emits the polarized light L12 obtained by polarizing the incident light L11 in a predetermined polarization direction. The alignment direction of the liquid crystal molecules 14 is, for example, the direction parallel to the polarization direction of the polarized light L12 as viewed from the front direction as illustrated in FIG. 7A. The inclination of the liquid crystal molecules 14 in a cross-sectional view changes in accordance with a voltage applied between the pixel electrodes 11 and the pixel electrodes 12 opposed to each other as illustrated in FIG. 7B. This causes the polarization state of phase-modulated light L14 emitted from the optical phase modulator 1 to change in accordance with the application voltage. The amount of light finally emitted from the analyzer 522 changes in accordance with the polarization state of the phase-modulated light L14.

As illustrated in FIG. 7A, the optical phase modulator 1 has optical disposition in which the polarization direction of the polarized light L12 is parallel to the alignment direction of the liquid crystal molecules 14. This causes the analyzer 522 to finally emit a different amount of light even in a case where the optical phase modulator 1 includes an optical member similar to that of the optical intensity modulator 501 illustrated in FIGS. 6A and 6B and a similar voltage is applied. It is not therefore possible to determine the relationship between the application voltage in each of pixels and the phase modulation amount as with the optical intensity modulator 501. It is difficult to confirm the deterioration position and the deterioration state of each of pixels.

1. First Embodiment

[1.1 Configuration]

FIG. 8 schematically illustrates a configuration example of a main portion of a display apparatus according to a first embodiment of the present disclosure. FIG. 9 illustrates an example of the pixel region of the optical phase modulator 1 in the display apparatus according to the first embodiment.

The display apparatus according to the first embodiment includes a light source 50 and the optical phase modulator 1. The optical phase modulator 1 modulates the phase of light from the light source 50. The optical phase modulator 1 has a configuration similar to that of the display apparatus according to the comparative example described above. In addition, the display apparatus includes a phase distribution calculation circuit 51, a phase modulator drive circuit 52, an adjustment controller 53, and a detector 56.

The phase distribution calculation circuit 51 is a phase distribution calculator that generates target phase distribution data (phase modulation signal) on the basis of an input signal. The target phase distribution data is data having phase distribution that allows the optical phase modulator 1 to reproduce the reproduction image 60 (target reproduction image) that is a target.

Here, for example, in a case where the optical phase modulator 1 is used as a portion of an illumination unit in a projector, the input signal is, for example, an image signal. In this case, the reproduction image 60 is an illumination image that illuminates an illumination object 5. The illumination object 5 is, for example, an optical intensity modulator such as an intensity modulation liquid crystal panel in the projector. In this case, the target phase distribution data is data having a phase distribution pattern that allows an illumination image to be formed which has the luminance distribution corresponding to an image to be displayed by the projector.

The phase modulator drive circuit 52 generates an application voltage (drive voltage) based on the target phase distribution data generated by the phase distribution calculation circuit 51 and drives the optical phase modulator 1 to allow each of pixels 10 to have target phase distribution. The phase modulator drive circuit 52 corresponds to a specific example of a "drive circuit" in the technology according to the present disclosure.

The optical phase modulator 1 modulates the phase of light from the light source 50 on the basis of the application voltage provided by the phase modulator drive circuit 52. The optical phase modulator 1 may be a transmissive phase modulator or a reflective phase modulator. The optical phase modulator 1 includes the plurality of pixels 10. The optical phase modulator 1 modulates the phase of light from the light source 50 for each of the pixels 10 by displaying a phase distribution pattern indicated by the target phase distribution data.

The detector 56 detects the state of the reproduction image 60 in a case where display based on the adjustment data in the optical phase modulator 1 is performed. The detector 56 is, for example, an imaging device including an imaging element.

The adjustment controller 53 includes an adjustment data generation section 54 and an application voltage control section 55. The adjustment controller 53 corresponds to a specific example of a "controller" in the technology according to the present disclosure.

The adjustment data generation section 54 generates adjustment data for adjusting the display state in the optical phase modulator 1. The adjustment data is data for determining the amount of voltage application performed by the phase modulator drive circuit 52. The data corresponds to the target phase distribution data.

The application voltage control section 55 divides the pixel region in the optical phase modulator 1 into a plurality of division regions 15, for example, as illustrated in FIG. 9. The application voltage control section 55 causes the phase modulator drive circuit 52 to perform voltage application based on the adjustment data to perform display based on the adjustment data in at least the one division region 15 of the plurality of division regions 15. It is to be noted that FIG. 9 illustrates the example in which the whole of the pixel region in the optical phase modulator 1 is divided into four in the horizontal direction (X direction) and three in the vertical direction (Y direction), but the number of division regions, the shape and size of each of the division regions 15, and the like are not limited to the example illustrated in FIG. 9.

The application voltage control section 55 adjusts the amount of voltage application based on the target phase distribution data on the basis of the state of the reproduction image 60 in a case where the display based on the adjustment data is performed in the optical phase modulator 1. The application voltage control section 55 determines the state of the reproduction image 60 on the basis of a result of the detection of the detector 56.

The application voltage control section 55 adjusts the amount of voltage application based on the target phase distribution data in each of the plurality of division regions 15 on the basis of the state of the reproduction image 60 in each of the plurality of division regions 15 in a case where the display based on the adjustment data is performed in each of the plurality of division regions 15. The pieces of adjustment data displayed in the plurality of respective division regions 15 may be different from each other.

[1.2 Operation]

(Example of Generation of Target Phase Distribution Data)

FIG. 10 illustrates an example of a technique of generating the target phase distribution data in the display apparatus according to the first embodiment. It is to be noted that a case where the target phase distribution data is generated in the GS method is described here as an example. The phase distribution may be, however, calculated in a method other than the GS method. Examples of the method of calculating the phase distribution include a diffractive method of deriving the phase distribution from a diffraction approximate expression of the Fresnel region or the Fraunhofer region and a refractive method of deriving the phase distribution as not a diffractive, but free-form lens. The GS method is a method of deriving the phase distribution from the diffraction approximate expression of the Fraunhofer region, but the method of calculating the phase distribution according to the present disclosure is not limited to this.

As illustrated in FIG. 10, the phase distribution calculation circuit 51 may generate the target phase distribution data in the GS method as a predetermined phase distribution calculation method.

The phase distribution calculation circuit 51 provides a random initial phase to a target reproduction image having intensity distribution to be reproduced as an initial condition and performs inverse Fourier transform (step S101). The phase distribution calculation circuit 51 may replace the phase of a resultant phase and amplitude with a uniform phase (step S102) and set the replaced phase as target phase distribution. Here, the phase is replaced with a uniform phase because it is assumed that the optical phase modulator 1 performs reproduction by using parallel light.

Next, the phase distribution calculation circuit 51 performs reproduction calculation by performing Fourier transform on the phase and the amplitude obtained in step S102 (step S103). This causes a reproduction image to be calculated.

Next, the phase distribution calculation circuit 51 replaces the amplitude of the phase and the amplitude obtained in step S103 with the amplitude of the target reproduction image (step S104).

Next, the phase distribution calculation circuit 51 performs inverse Fourier transform on the phase and the amplitude obtained in step S104 (step S105) and performs repeated calculation (iteration) from this onward for repeatedly performing the calculation in steps S102 to S105. The repeated calculation may be performed until a reproduction image having satisfactory quality as the target reproduction image is obtained.

In a case where the optical phase modulator 1 attempts to reproduce the same target reproduction image over a plurality of frames or a plurality of sub-frames, the phase distribution calculation circuit 51 may change the phase distribution of the target phase distribution data by temporally changing at least the random initial phase for each frame or for each sub-frame in the calculation by using the GS method described above (step S201).

In addition, in a similar case, the phase distribution calculation circuit 51 may change the phase distribution of the target phase distribution data by temporally changing at least the number of times repeated calculation is performed in the calculation by using the GS method described above (step S202).

(Adjustment Example of Optical Phase Modulator 1)

FIG. 11 illustrates an example of the phase distribution of the division regions 15 of the optical phase modulator 1 in the X direction from which the adjustment data in the display apparatus according to the first embodiment originates. FIGS. 12A 12B, 12C, and 12D illustrate an example of the adjustment data in the display apparatus according to the first embodiment. FIG. 13 illustrates a display example of the optical phase modulator 1 based on the adjustment data in the display apparatus according to the first embodiment and an example of the reproduction image 60 corresponding to the adjustment data.

The display apparatus according to the first embodiment divides the pixel region in the optical phase modulator 1 into the plurality of division regions 15, for example, as illustrated in FIG. 9 and performs display based on the adjustment data in at least the one division region 15 to make an appropriate correction for the optical phase modulator 1. The detector 56 detects the state of the reproduction image 60 in this state. This makes it possible to detect the local deterioration position and deterioration state in the optical phase modulator 1 and determine the optimal amount of voltage application at each pixel position For example, in a case where the phase distribution from which the adjustment data originates is distribution simulating a lens shape as illustrated in FIG. 11, the light L10 from the light source 50 is condensed on the reproduction image 60 as illustrated in FIG. 13. There is a plurality of pieces of adjustment data that reproduces such phase distribution, for example, as illustrated in FIGS. 12A, 12B, 12C, and 12D. The adjustment data illustrated in FIG. 12A is an example in which the original phase distribution is allocated within an application voltage range of 2 V to 4 V. In a case where FIG. 12A is used as reference adjustment data, FIG. 12B illustrates an example in which the voltage is shifted within an application voltage range of 0 V to 2 V with respect to the adjustment data in FIG. 12A. FIG. 12C illustrates an example in which the voltage step of the application voltage is changed with respect to the adjustment data in FIG. 12A. FIG. 12D illustrates an example in which the application voltage range is changed into 0 V to 4 V with respect to the adjustment data in FIG. 12A.

In a case where the phase distribution simulating the lens shape as illustrated in FIG. 11 is displayed in the division regions 15, the degree of light condensation increases on the reproduction image 60 as the adjustment data comes closer to the optimal value as illustrated in FIG. 13. The adjustment controller 53 detects the degree of light condensation by the detector 56. This makes it possible to determine which adjustment data is optimal, for example, among the pieces of adjustment data in FIGS. 12A, 12B, 12C, and 12D. This makes it possible to determine the optimal application voltage amount in the division regions 15.

The optimal application voltage amount may be determined by performing display based on pieces of adjustment data different from each other in the plurality of respective division regions 15 as illustrated in FIG. 13. The optimal application voltage amount may be determined by performing display based on the same adjustment data in the plurality of respective division regions 15 and switching the pieces of adjustment data until the optimum application voltage amount is determined. Performing display based on the pieces of adjustment data different from each other in the plurality of respective division regions 15 makes it possible to shorten the adjustment time.

In addition, it is preferable to create the target phase distribution data from which the adjustment data originates by taking into consideration the wavelength of light entering the optical phase modulator 1 or the pixel pitch of the optical phase modulator 1. As long as it is possible to determine a change in the adjustment state in the division region 15 to be adjusted, a specific algorithm of creating the target phase distribution data, a specific number of division regions 15, a specific light condensation position and shape of the reproduction image 60, and the like are not limitative.

[1.3 Effects]

As described above, the display apparatus according to the first embodiment divides the pixel region in the optical phase modulator 1 into the plurality of division regions 15 and performs the voltage application based on the adjustment data to perform the display based on the adjustment data in at least one division region of the plurality of division regions 15. The adjustment data is for determining the amount of voltage application performed by the phase modulator drive circuit 52. The amount of voltage application corresponds to the target phase distribution data. This makes it easier to appropriately adjust the amount of voltage application to the optical phase modulator 1 and makes it possible to achieve higher image quality.

In addition, the display apparatus according to the first embodiment simplifies a step of adjusting the optical phase modulator 1, making it possible to achieve higher productivity. In addition, it is possible to improve the life of the display apparatus due to the deteriorated characteristic of the optical phase modulator 1.

It is to be noted that the effects described in this specification are merely illustrative, but not limitative. In addition, there may be any other effects. The same applies to the effects of the following other embodiments.

2. Second Embodiment

Next, a display apparatus according to a second embodiment of the present disclosure is described. It is to be noted that the following denotes a component which is substantially the same as that of the display apparatus according to the first embodiment described above with the same sign and omits description as appropriate.

FIG. 14 schematically illustrates a configuration example of a main portion of the display apparatus according to the second embodiment.

The display apparatus according to the second embodiment further includes an adjustment data storage section 57 in addition to the components of the display apparatus according to the first embodiment illustrated in FIG. 8. The adjustment data storage section 57 stores predetermined adjustment data in advance.

To adjust the display state in the optical phase modulator 1, it is necessary to select the optimal adjustment data in accordance with an algorithm that is used to create the target phase distribution data. For example, some pieces of target phase distribution data use the refraction of light by reproducing a free-form lens by the phase and control the light ray angle by using the diffraction of light as in the GS method. The respective pieces of target phase distribution data have different optimal amounts of voltage application.

The adjustment data storage section 57 thus stores, in advance, pieces of adjustment data having different application voltage ranges, voltage steps different in number, and different voltage step widths. This allows the adjustment controller 53 to select the optimal adjustment data corresponding to an algorithm to be adopted, make an adjustment easier, and shorten the adjustment time. In addition, in a case of an algorithm that uses diffraction, pieces of adjustment data created by using the GS method or the like for the respective adjustments cause the respective pieces of target phase distribution data to be different due to the characteristic of the algorithm. In a case where the different pieces of target phase distribution data are compared, the adjustment accuracy may decrease because the noise state of the reproduction image 60 is different. To avoid this, it is effective to use specific adjustment data for each adjustment.

FIG. 15 illustrates an example of the desired phase distribution of the adjustment data in a case where refraction is used in the display apparatus according to the second embodiment.

FIGS. 16A and 16B illustrate an example of adjustment data that achieves the desired phase distribution illustrated in FIG. 15 in a case where it is possible to obtain a phase adjustment amount of $2\pi$ in the optical phase modulator 1. In a case where it is possible to obtain a phase adjustment amount of $2\pi$ in the optical phase modulator 1 as illustrated in FIG. 16A, it is possible to reproduce the desired phase distribution illustrated in FIG. 15 as it is as illustrated in FIG. 16B.

FIGS. 17A and 17B illustrate an example of adjustment data that achieves phase distribution corresponding to the desired phase distribution illustrated in FIG. 15 in a case where it is possible to obtain only a phase adjustment amount of $1.5\pi$ in the optical phase modulator 1. In a case where it is possible to obtain only a phase adjustment amount of $1.5\pi$ in the optical phase modulator 1 as illustrated in FIG. 17A, it is possible to reproduce the phase distribution corresponding to the desired phase distribution by making an adjustment to have a maximum phase value of $1.5\pi$ with respect to the desired phase distribution illustrated in FIG. 15 as illustrated in FIG. 17B.

FIG. 18 illustrates an example of the desired phase distribution of the adjustment data in a case where diffraction is used in the display apparatus according to the second embodiment. The desired phase distribution illustrated in FIG. 18 indicates an example of the phase distribution corresponding to a blazed grating.

FIGS. 19A and 19B illustrate an example of adjustment data that achieves the desired phase distribution illustrated in FIG. 18 in a case where it is possible to obtain a phase adjustment amount of $2\pi$ in the optical phase modulator 1. In a case where it is possible to obtain a phase adjustment amount of $2\pi$ in the optical phase modulator 1 as illustrated in FIG. 19A, it is possible to reproduce the desired phase distribution illustrated in FIG. 18 as it is as illustrated in FIG. 19B.

FIGS. 20A and 20B illustrate an example of adjustment data that achieves phase distribution corresponding to the desired phase distribution illustrated in FIG. 18 in a case where it is possible to obtain only a phase adjustment amount of $1.5\pi$. In a case where it is possible to obtain only a phase adjustment amount of $1.5\pi$ in the optical phase modulator 1 as illustrated in FIG. 20A, it is possible to reproduce the phase distribution corresponding to the desired phase distribution by making an adjustment to have a maximum phase value of $1.5\pi$ with respect to the desired phase distribution illustrated in FIG. 18 as illustrated in FIG. 20B. In this case, the voltage steps are adjusted to obtain the desired blazed grating illustrated in FIG. 18. The number of voltage steps is the integer value of $2\pi/(2\pi-\text{Max modulation amount})$. The Max modulation amount is $1.5\pi$ in this case. The number of voltage steps is the integer value of 4.

Other configurations, operations, and effects may be substantially similar to those of the display apparatus according to the first embodiment described above.

3. Third Embodiment

Next, a display apparatus according to a third embodiment of the present disclosure is described. It is to be noted that the following denotes a component which is substantially the same as that of the display apparatus according to the first or second embodiment described above with the same sign and omits description as appropriate.

FIG. 21 schematically illustrates a configuration example of a main portion of the display apparatus according to the third embodiment.

The display apparatus according to the third embodiment further includes an initial state storage section 58 in addition to the components of the display apparatus according to the first embodiment illustrated in FIG. 8. The initial state storage section 58 stores, in advance, the data of the initial state of the amount of voltage application corresponding to the target phase distribution data.

The adjustment controller 53 adjusts the amount of voltage application based on the target phase distribution data on the basis of the data of the initial state stored in the initial state storage section 58 and the state of the reproduction image 60 in a case where the display based on the adjustment data is performed in the optical phase modulator 1.

FIG. 22 illustrates an example of the deterioration of the modulation characteristic of the optical phase modulator 1.

In a case where the display state is adjusted in accordance with the deterioration state of the optical phase modulator 1, referring to the initial state of the optical phase modulator 1 makes it easier to make an adjustment. Examples of the deterioration of an element include light resistance deterioration or humidity resistance deterioration. FIG. 22 illustrates an example of the light resistance deterioration.

It is known that the relationship (VΦ curve) between the application voltage and the phase modulation amount shifts from the initial state as illustrated in FIG. 22 because, for example, the light resistance deterioration decomposes the liquid crystal molecules or deteriorates the alignment film to change the pre-tilt state of the liquid crystal. In this case, the VΦ curve shifts, but the relationship between the phase change amount and the application voltage used for the initial adjustment is considered to be applicable or adoptable by making a minute adjustment because the inclination after the rise of the curve does not change significantly. The initial state storage section 58 stores the data of this initial state.

In addition, the humidity resistance deterioration raises an issue that it is not possible to obtain the desired phase because the entry of moisture onto the alignment film in the optical phase modulator 1 causes current leakage between pixels. There is a method of correcting the influence of the current leakage by increasing the potential difference between the pixels in this case. This means the expansion of the voltage step with respect to the phase. The initial state storage section 58 then stores the initial relationship between the phase change amount and the application voltage and the application voltage range. The adjustment controller 53 is able to easily achieve setting in which the initial voltage step is expanded by referring to the stored relationship and the stored application voltage range in making an adjustment.

Other configurations, operations, and effects may be substantially similar to those of the display apparatus according to the first embodiment described above.

4. Fourth Embodiment

Next, a display apparatus according to a fourth embodiment of the present disclosure is described. It is to be noted that the following denotes a component which is substantially the same as that of the display apparatus according to any of the first to third embodiments described above with the same sign and omits description as appropriate.

In the fourth embodiment, an application example is described in which the display apparatus according to any of the first to third embodiments described above is applied to a projector. The display apparatus according to any of the first to third embodiments described above is applied to a projector and an appropriate adjustment is made for the optical phase modulator 1. This leads to a projector that is higher in image quality and longer in life.

The projector according to the fourth embodiment includes an illumination unit and an optical intensity modulator that generates a projection image by modulating the intensity of illumination light from the illumination unit. The illumination unit includes a light source and a phase modulation device that modulates the phase of light from the light source. The phase modulation device includes the optical phase modulator 1 in the display apparatus according to any of the first to third embodiments described above, a circuit that drives the optical phase modulator 1, and the like. The reproduction image 60 by the optical phase modulator 1 is used as an illumination image having the luminance distribution corresponding to an image to be displayed by the projector. This illumination image is used as illumination light for the light intensity modulator.

FIG. 23 illustrates a first application example in which the display apparatus is applied to a projector.

This first application example is a configuration example in which the optical phase modulator 1 is a reflective optical phase modulator 111.

A projector 100 includes a light source device 110, an illumination optical system 120, an image forming section 130, and a projection optical system 140. The reflective optical phase modulator 111 is disposed between the light source device 110 and the illumination optical system 120.

The image forming section 130 includes reflective polarizing plates 31A, 31B, and 31C, reflective liquid crystal panels 32A, 32B, and 32C, and a dichroic prism 33. The reflective liquid crystal panels 32A, 32B, and 32C are optical intensity modulators.

The light source device 110 emits light including red light, green light, and blue light. The light source device 110 includes one or more laser light sources that emit white light including red light, green light, and blue light, for example. In addition, the light source device 110 may include one or more laser light sources for each color. The one or more laser light sources for each color emit the pieces of color light including red (R) light, green (G) light, and blue (B) light.

The reflective optical phase modulator 111 generates a desired illumination image (illumination light) by modulating the phase of light from the light source device 110. The reflective liquid crystal panels 32A, 32B, and 32C are illuminated with the illumination light generated by the reflective optical phase modulator 111 via the illumination optical system 120.

The illumination optical system 120 includes dichroic mirrors 24A and 24B, reflecting mirrors 25A and 25B, lenses 26A and 26B, a dichroic mirror 27, and polarizing plates 28A, 28B, and 28C.

The dichroic mirrors 24A and 24B selectively reflect light in a predetermined wavelength region and selectively transmit light in the other wavelength regions. For example, the dichroic mirror 24A reflects mainly red light and green light in the direction of the reflecting mirror 25A. In addition, the dichroic mirror 24B reflects mainly blue light in the direction of the reflecting mirror 25B. The reflecting mirror 25A reflects the light (mainly red light and green light) from the dichroic mirror 24A toward the lens 26A. The reflecting mirror 25B reflects the light (mainly blue light) from the dichroic mirror 24B toward the lens 26B. The lens 26A transmits the light (mainly red light and green light) from the reflecting mirror 25A and condenses the light on the dichroic mirror 27. The lens 26B transmits the light (mainly blue light) from the reflecting mirror 25B and condenses the light on the dichroic mirror 27. The dichroic mirror 27 selectively reflects green light and selectively transmits light in the other wavelength regions. The dichroic mirror 27 transmits, for example, a red light component and reflects a green light component toward the polarizing plate 28C. Each of the polarizing plates 28A, 28B, and 28C includes a polarizer having a polarization axis in a predetermined direction. Each of the polarizing plates 28A, 28B, and 28C transmits, for example, P-polarized light and reflects S-polarized light.

The reflective polarizing plates 31A, 31B, and 31C respectively transmit pieces of light (e.g., pieces of P-polarized light) having the same polarization axes as those of pieces of polarized light from the polarizing plates 28A, 28B, and 28C and reflect pieces of light (pieces of S-polarized light) having different polarization axes. Specifically, the reflective polarizing plate 31A transmits the P-polarized red light from the polarizing plate 28A in the direction of the reflective liquid crystal panel 32A. The reflective polarizing plate 31B transmits the P-polarized blue light from the polarizing plate 28B in the direction of the reflective liquid crystal panel 32B. The reflective polarizing plate 31C transmits the P-polarized green light from the polarizing plate 28C in the direction of the reflective liquid crystal panel 32C. Further, the reflective polarizing plate 31A reflects the S-polarized red light from the reflective liquid crystal panel 32A and causes the light to enter the dichroic prism 33. The reflective polarizing plate 31B reflects the S-polarized blue light from the reflective liquid crystal panel 32B and causes the light to enter the dichroic prism 33. The reflective polarizing plate 31C reflects the S-polarized green light from the reflective liquid crystal panel 32C and causes the light to enter the dichroic prism 33.

Each of the reflective liquid crystal panels 32A, 32B, and 32C modulates the intensity of the red light, the blue light, or the green light.

The dichroic prism 33 combines the red light, the blue light, and the green light whose intensities have been modulated by the reflective liquid crystal panels 32A, 32B, and 32C and emits the combined light toward the projection optical system 140 as a projection image.

The projection optical system 140 includes lenses L41, L42, L43, and L44. The projection optical system 140 magnifies a projection image generated by the image forming section 130 and projects the projection image onto a projection surface such as a screen that is not illustrated. It is to be noted that the number of lenses and the lens configuration in the projection optical system 140 are not limited to the illustrated configuration, but may include another number of lenses and have another lens configuration. In addition, other optical elements such as a reflecting mirror and an optical filter may be included in the optical path.

FIG. 24 illustrates a second application example in which the display apparatus is applied to a projector.

This second application example is a configuration example in which the optical phase modulator 1 is a transmissive optical phase modulator 112.

In a projector 100A, the transmissive optical phase modulator 112 is disposed between the light source device 110 and the illumination optical system 120.

The other components are similar to those of the first application example in FIG. 23.

Modification Example

It is to be noted that the above has described the configuration example of the projector as the configuration example of the display apparatus in which the optical phase modulator 1 and the optical intensity modulator are combined, but the display apparatus may dispense with any optical intensity modulator. For example, the display apparatus may use the reproduction image 60 itself as a display image instead of using the reproduction image 60 by the optical phase modulator 1 for illumination light.

5. Other Embodiments

The technology according to the present disclosure is not limited to the description of each of the embodiments described above, but may be modified in a variety of ways.

For example, the present technology may also have configurations as follows.

The present technology having the following configurations makes it easier to appropriately adjust the amount of voltage application to the optical phase modulator and makes it possible to achieve higher image quality.

(1)

A display apparatus including:

a light source;

an optical phase modulator including a plurality of pixels, the optical phase modulator modulating a phase of light from the light source for each of the pixels by displaying a phase distribution pattern indicated by phase distribution data;

a drive circuit that performs voltage application to the optical phase modulator, the voltage application being based on the phase distribution data; and a controller that divides a pixel region in the optical phase modulator into a plurality of division regions, the controller causing the drive circuit to perform voltage application based on adjustment data to perform display in at least one division region of the plurality of division regions, the adjustment data being for determining an amount of voltage application performed by the drive circuit, the amount of voltage application corresponding to the phase distribution data, the display being based on the adjustment data.

(2)

The display apparatus according to (1), in which the controller adjusts an amount of voltage application based on the phase distribution data on the basis of a state of a reproduction image in a case where the display based on the adjustment data is performed in the optical phase modulator.

(3)

The display apparatus according to (2), in which the controller adjusts the amount of voltage application based on the phase distribution data in each of the plurality of division regions on the basis of a state of a reproduction image in each of the plurality of division regions in a case where the display based on the adjustment data is performed in each of the plurality of division regions.

(4)

The display apparatus according to (2) or (3), further including a detector that detects the state of the reproduction image in the case where the display based on the adjustment data is performed in the optical phase modulator.

(5)

The display apparatus according to (3) or (4), in which the controller adjusts the amount of voltage application based on the phase distribution data in each of the plurality of division regions on the basis of a state of a reproduction image in each of the plurality of division regions in a case where display based on pieces of adjustment data is performed in each of the plurality of division regions, the pieces of adjustment data being different from each other.

(6)

The display apparatus according to any one of (1) to (5), further including a storage section that stores the adjustment data.

(7)

The display apparatus according to any one of (1) to (5), further including a storage section that stores data of an initial state of the amount of voltage application corresponding to the phase distribution data, in which the controller adjusts an amount of voltage application based on the phase distribution data on the basis of the data of the initial state stored in the storage section and a state of a reproduction image in a case where display based on the adjustment data is performed in the optical phase modulator.

(8)

The display apparatus according to any one of (1) to (7), further including an optical intensity modulator that generates an image by using a reproduction image based on the phase distribution data by the optical phase modulator as illumination light and modulating an intensity of the illumination light.

(9)

The display apparatus according to (8), further including a projection optical system that projects an image generated by the optical intensity modulator.

(10)

A method of adjusting a display apparatus including:

modulating, by displaying a phase distribution pattern on an optical phase modulator including a plurality of pixels, a phase of light from the light source for each of the pixels, the phase distribution pattern being indicated by phase distribution data;

performing, by a drive circuit, voltage application to the optical phase modulator, the voltage application being based on the phase distribution data; and dividing, by a controller, a pixel region in the optical phase modulator into a plurality of division regions and causing the drive circuit to perform voltage application based on adjustment data to perform display in at least one division region of the plurality of division regions, the adjustment data being for determining an amount of voltage application performed by the drive circuit, the amount of voltage application corresponding to the phase distribution data, the display being based on the adjustment data.

This application claims the priority on the basis of Japanese Patent Application No. 2019-003100 filed on Jan. 11, 2019 with Japan Patent Office, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A display apparatus, comprising:
a light source;
an optical phase modulator including a plurality of pixels, wherein the optical phase modulator is configured to modulate a phase of light from the light source for each pixel of the plurality of pixels by display of a phase distribution pattern indicated by phase distribution data;
a drive circuit configured to execute voltage application to the optical phase modulator, wherein the voltage application is based on the phase distribution data;
a storage section configured to store data of an initial state of an amount of the voltage application corresponding to the phase distribution data; and
a controller configured to:
divide a pixel region in the optical phase modulator into a plurality of division regions;
generate a plurality of pieces of adjustment data based on the phase distribution data in the plurality of division regions;
detect a state of a reproduction image in a case where the display of the phase distribution pattern is performed in the optical phase modulator based on the plurality of pieces of adjustment data different from one another in the plurality of division regions, wherein the detected state of the reproduction image includes a degree of light condensation on the reproduction image;
determine, based on the degree of light condensation detected on the reproduction image, an optimal adjustment data from the plurality of pieces of adjustment data, wherein the determination is based on a relation that the degree of light condensation increases on the reproduction image as the adjustment data reaches an optimal value;
control the drive circuit to execute the voltage application in each of the plurality of division regions in accordance with the detected state of the reproduction image in each of the plurality of division regions, wherein
the control of the drive circuit is based on the optimal adjustment data,
the control of the drive circuit is for the display of the phase distribution pattern in at least one division region of the plurality of division regions,
the optimal adjustment data indicates the amount of the voltage application by the drive circuit, and
the amount of the voltage application corresponds to the phase distribution data; and
adjust the amount of the voltage application based on the data of the initial state stored in the storage section and the detected state of the reproduction image.

2. The display apparatus according to claim 1, wherein the controller is further configured to adjust the amount of the voltage application based on the phase distribution data in each division region of the plurality of division regions in accordance with the detected state of the reproduction image in each of the plurality of division regions in a case where the display based on the plurality of pieces of adjustment data is performed in each of the plurality of division regions.

3. The display apparatus according to claim 1, wherein the storage section is further configured to store the plurality of pieces of adjustment data.

4. The display apparatus according to claim 1, further comprising
an optical intensity modulator configured to:
generate, as illumination light, an image using the reproduction image based on the phase distribution data; and
modulate an intensity of the illumination light.

5. The display apparatus according to claim 4, further comprising a projection optical system configured to project the image generated by the optical intensity modulator.

6. A method of adjusting a display apparatus, the method comprising:
modulating, by displaying a phase distribution pattern on an optical phase modulator including a plurality of pixels, a phase of light from a light source for each pixel of the plurality of pixels, wherein the phase distribution pattern is indicated by phase distribution data;
storing, by a storage section, data of an initial state of an amount of voltage application corresponding to the phase distribution data;
executing, by a drive circuit, voltage application to the optical phase modulator, wherein the voltage application is based on the phase distribution data;
dividing, by a controller, a pixel region in the optical phase modulator into a plurality of division regions;

generating, by the controller, a plurality of pieces of adjustment data based on the phase distribution data in the plurality of division regions;

detecting, by the controller, a state of a reproduction image in a case where the display of the phase distribution pattern is performed in the optical phase modulator based on the plurality of pieces of adjustment data different from one another in the plurality of division regions, wherein the detected state of the reproduction image includes a degree of light condensation on the reproduction image;

determining, by the controller, based on the degree of light condensation detected on the reproduction image, an optimal adjustment data from the plurality of pieces of adjustment data, wherein the determination is based on a relation that the degree of light condensation increases on the reproduction image as the adjustment data reaches an optimal value;

controlling, by the controller, the drive circuit to execute the voltage application in each of the plurality of division regions in accordance with the detected state of the reproduction image in each of the plurality of division regions, wherein
the control of the drive circuit is based on the optimal adjustment data,
the control of the drive circuit is for the display of the phase distribution pattern in at least one division region of the plurality of division regions,
the optimal adjustment data indicates the amount of the voltage application executed by the drive circuit, and
the amount of the voltage application corresponds to the phase distribution data; and adjusting, by the controller, the amount of the voltage application based on the data of the initial state stored in the storage section and the detected state of the reproduction image.

* * * * *